US011984687B2

(12) United States Patent
Krenceski et al.

(10) Patent No.: US 11,984,687 B2
(45) **Date of Patent: *May 14, 2024**

(54) CONNECTOR HAVING A GROUNDING MEMBER

(71) Applicant: PPC BROADBAND, INC., East Syracuse, NY (US)

(72) Inventors: Mary Krenceski, Troy, NY (US); Roger Mathews, Syracuse, NY (US); Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,316

(22) Filed: May 31, 2023

(65) Prior Publication Data

US 2023/0307877 A1 Sep. 28, 2023

Related U.S. Application Data

(63) Continuation of application No. 17/196,545, filed on Mar. 9, 2021, which is a continuation of application (Continued)

(51) Int. Cl.
*H01R 13/658* (2011.01)
*H01R 9/05* (2006.01)

(Continued)

(52) U.S. Cl.
CPC ......... *H01R 13/658* (2013.01); *H01R 9/0512* (2013.01); *H01R 9/0521* (2013.01);

(Continued)

(58) Field of Classification Search
CPC ........ Y10T 29/49174; Y10T 29/49204; H01R 13/6596; H01R 9/0512; H01R 9/0521;

(Continued)

(56) References Cited

U.S. PATENT DOCUMENTS

| | | | |
|---|---|---|---|
| 331,169 | A | 11/1885 | Thomas |
| 1,371,742 | A | 3/1921 | Dringman |

(Continued)

FOREIGN PATENT DOCUMENTS

| | | |
|---|---|---|
| CA | 2096710 | 11/1994 |
| CN | 201149936 | 11/2008 |

(Continued)

OTHER PUBLICATIONS

Inter Partes Review Case IPR2022-00718 of U.S. Pat. No. 10,965,063 (Claims 1-6, 10-17, 20, and 21), Petitioner's Reply, Paper 23, 39 pages, Apr. 18, 2023.

(Continued)

*Primary Examiner* — Edwin A. Leon
(74) *Attorney, Agent, or Firm* — MH2 TECHNOLOGY LAW GROUP LLP

(57) ABSTRACT

A connector includes a body having a central bore and a first grounding contact surface, a post disposed within the central bore and having an outwardly projecting flange configured to produce a first portion of a mating interface, and a conductive coupler. The post portion has a tubular sleeve configured to mechanically and electrically engage a prepared end of a coaxial cable. The conductive coupler has an engagement surface at a first end configured to mechanically and electrically engage an interface port, a lip at a second end configured to produce a second portion of the mating interface, and a second grounding contact surface opposing the first grounding contact surface. The first and second portions are configured to slide along the mating interface to rotate about an elongate axis of the connector. The connector includes a conductive ring disposed between the first and second grounding contact surfaces and configured to produce an electrical path between the body and the conductive coupler.

30 Claims, 9 Drawing Sheets

Related U.S. Application Data

No. 16/653,713, filed on Oct. 15, 2019, now Pat. No. 10,965,063, which is a continuation of application No. 16/050,726, filed on Jul. 31, 2018, now Pat. No. 10,446,983, which is a continuation of application No. 15/431,018, filed on Feb. 13, 2017, now Pat. No. 10,038,284, which is a continuation of application No. 15/094,451, filed on Apr. 8, 2016, now Pat. No. 9,570,859, which is a continuation of application No. 13/448,937, filed on Apr. 17, 2012, now Pat. No. 9,312,611, which is a continuation of application No. 13/118,617, filed on May 31, 2011, now Pat. No. 8,157,589, which is a continuation-in-part of application No. 12/941,709, filed on Nov. 8, 2010, now Pat. No. 7,950,958, and a continuation-in-part of application No. 12/418,103, filed on Apr. 3, 2009, now Pat. No. 8,071,174, which is a continuation of application No. 12/397,087, filed on Mar. 3, 2009, now Pat. No. 7,828,595, which is a continuation of application No. 10/997,218, filed on Nov. 24, 2004, now abandoned.

(51) Int. Cl.

| | |
|---|---|
| ***H01R 13/52*** | (2006.01) |
| ***H01R 13/622*** | (2006.01) |
| ***H01R 13/6584*** | (2011.01) |
| ***H01R 13/6596*** | (2011.01) |
| ***H01R 24/40*** | (2011.01) |
| ***H01R 103/00*** | (2006.01) |

(52) U.S. Cl.

CPC ....... *H01R 9/0524* (2013.01); *H01R 13/5202* (2013.01); *H01R 13/5219* (2013.01); *H01R 13/622* (2013.01); *H01R 13/6596* (2013.01); *H01R 24/40* (2013.01); *H01R 13/6584* (2013.01); *H01R 2103/00* (2013.01); *Y10T 29/49174* (2015.01); *Y10T 29/49204* (2015.01)

(58) Field of Classification Search

CPC .. H01R 24/40; H01R 9/0524; H01R 13/5202; H01R 13/622; H01R 13/65802; H01R 13/5219; H01R 13/658; H01R 2103/00

USPC ... 439/578–585, 63, 733.1, 944, 271, 98–99

See application file for complete search history.

(56) References Cited

U.S. PATENT DOCUMENTS

| | | | | |
|---|---|---|---|---|
| 1,667,485 A | | 4/1928 | MacDonald | |
| 1,766,869 A | | 6/1930 | Austin | |
| 1,801,999 A | | 4/1931 | Bowman | |
| 1,885,761 A | | 11/1932 | Pierce, Jr. | |
| 2,102,495 A | | 12/1937 | England | |
| 2,258,737 A | | 10/1941 | Browne | |
| 2,325,549 A | | 7/1943 | Ryzowitz | |
| 2,480,963 A | | 9/1949 | Quinn | |
| 2,544,654 A | | 3/1951 | Brown | |
| 2,549,647 A | | 4/1951 | Turene | |
| 2,694,187 A | | 11/1954 | Nash | |
| 2,754,487 A | | 7/1956 | Carr et al. | |
| 2,755,331 A | | 7/1956 | Melcher | |
| 2,757,351 A | | 7/1956 | Klostermann | |
| 2,762,025 A | | 9/1956 | Melcher | |
| 2,805,399 A | | 9/1957 | Leeper | |
| 2,870,420 A | | 1/1959 | Malek | |
| 3,001,169 A | | 9/1961 | Blonder | |
| 3,015,794 A | | 1/1962 | Kishbaugh | |
| 3,091,748 A | | 5/1963 | Takes et al. | |
| 3,094,364 A | | 6/1963 | Lingg | |
| 3,184,706 A | | 5/1965 | Atkins | |
| 3,194,292 A | | 7/1965 | Borowsky | |
| 3,196,382 A | | 7/1965 | Morello, Jr. | |
| 3,245,027 A | | 4/1966 | Ziegler, Jr. | |
| 3,275,913 A | | 9/1966 | Blanchard | |
| 3,278,890 A | | 10/1966 | Cooney | |
| 3,281,757 A | | 10/1966 | Bonhomme | |
| 3,292,136 A | | 12/1966 | Somerset | |
| 3,320,575 A | | 5/1967 | Brown et al. | |
| 3,321,732 A | | 5/1967 | Forney, Jr. | |
| 3,336,563 A | | 8/1967 | Hyslop | |
| 3,348,186 A | | 10/1967 | Rosen | |
| 3,350,677 A | | 10/1967 | Daum | |
| 3,355,698 A | | 11/1967 | Keller | |
| 3,373,243 A | | 3/1968 | Janowiak | |
| 3,390,374 A | | 6/1968 | Forney, Jr. | |
| 3,406,373 A | | 10/1968 | Forney, Jr. | |
| 3,448,430 A | | 6/1969 | Kelly | |
| 3,453,376 A | | 7/1969 | Ziegler, Jr. et al. | |
| 3,465,281 A | | 9/1969 | Florer | |
| 3,475,545 A | | 10/1969 | Stark | |
| 3,494,400 A | | 2/1970 | McCoy et al. | |
| 3,498,647 A | | 3/1970 | Schroder | |
| 3,501,737 A | | 3/1970 | Harris et al. | |
| 3,517,373 A | | 6/1970 | Jamon | |
| 3,526,871 A | | 9/1970 | Hobart | |
| 3,533,051 A | | 10/1970 | Ziegler, Jr. | |
| 3,537,065 A | | 10/1970 | Winston | |
| 3,544,705 A | | 12/1970 | Winston | |
| 3,551,882 A | | 12/1970 | O'Keefe | |
| 3,564,487 A | | 2/1971 | Upstone | |
| 3,587,033 A | | 6/1971 | Brorein et al. | |
| 3,601,776 A | | 8/1971 | Curl | |
| 3,629,792 A | | 12/1971 | Dorrell | |
| 3,633,150 A | | 1/1972 | Swartz | |
| 3,646,502 A | | 2/1972 | Hutter et al. | |
| 3,663,926 A | | 5/1972 | Brandt | |
| 3,665,371 A | | 5/1972 | Cripps | |
| 3,668,612 A | | 6/1972 | Nepovim | |
| 3,669,472 A | | 6/1972 | Nadsady | |
| 3,671,922 A | | 6/1972 | Zerlin et al. | |
| 3,678,444 A | | 7/1972 | Stevens et al. | |
| 3,678,445 A | | 7/1972 | Brancaleone | |
| 3,678,455 A | | 7/1972 | Brancaleone | |
| 3,680,034 A | | 7/1972 | Chow et al. | |
| 3,681,739 A | | 8/1972 | Kornick | |
| 3,683,320 A | | 8/1972 | Woods et al. | |
| 3,686,623 A | | 8/1972 | Nijman | |
| 3,694,792 A | | 9/1972 | Wallo | |
| 3,706,958 A | | 12/1972 | Blanchenot | |
| 3,710,005 A | | 1/1973 | French | |
| 3,739,076 A | | 6/1973 | Schwartz | |
| 3,744,007 A | | 7/1973 | Horak | |
| 3,744,011 A | | 7/1973 | Blanchenot | |
| 3,778,535 A | | 12/1973 | Forney, Jr. | |
| 3,781,762 A | | 12/1973 | Quackenbush | |
| 3,781,898 A | | 12/1973 | Holloway | |
| 3,793,610 A | | 2/1974 | Brishka | |
| 3,798,589 A | | 3/1974 | Deardurff | |
| 3,808,580 A | | 4/1974 | Johnson | |
| 3,810,076 A | | 5/1974 | Hutter | |
| 3,835,443 A | | 9/1974 | Arnold et al. | |
| 3,836,700 A | | 9/1974 | Niemeyer | |
| 3,845,453 A | | 10/1974 | Hemmer | |
| 3,846,738 A | | 11/1974 | Nepovim | |
| 3,854,003 A | | 12/1974 | Duret | |
| 3,858,156 A | | 12/1974 | Zarro | |
| 3,879,102 A | * | 4/1975 | Horak | H01R 9/0521 439/89 |
| 3,886,301 A | | 5/1975 | Cronin et al. | |
| 3,907,399 A | | 9/1975 | Spinner | |
| 3,910,673 A | | 10/1975 | Stokes | |
| 3,915,539 A | | 10/1975 | Collins | |
| 3,936,132 A | | 2/1976 | Hutter | |
| 3,953,097 A | | 4/1976 | Graham | |
| 3,963,320 A | | 6/1976 | Spinner | |
| 3,963,321 A | | 6/1976 | Burger et al. | |
| 3,970,355 A | | 7/1976 | Pitschi | |
| 3,972,013 A | | 7/1976 | Shapiro | |
| 3,976,352 A | | 8/1976 | Spinner | |

(56) References Cited

U.S. PATENT DOCUMENTS

| | | | |
|---|---|---|---|
| 3,980,805 A | | 9/1976 | Lipari |
| 3,985,418 A | | 10/1976 | Spinner |
| 4,017,139 A | | 4/1977 | Nelson |
| 4,022,966 A | | 5/1977 | Gajajiva |
| 4,030,798 A | | 6/1977 | Paoli |
| 4,046,451 A | | 9/1977 | Juds et al. |
| 4,053,200 A | | 10/1977 | Pugner |
| 4,059,330 A | | 11/1977 | Shirey |
| 4,079,343 A | | 3/1978 | Nijman |
| 4,082,404 A | | 4/1978 | Flatt |
| 4,090,028 A | | 5/1978 | Vontobel |
| 4,093,335 A | | 6/1978 | Schwartz et al. |
| 4,106,839 A | | 8/1978 | Cooper |
| 4,125,308 A | | 11/1978 | Schilling |
| 4,126,372 A | | 11/1978 | Hashimoto et al. |
| 4,131,332 A | | 12/1978 | Hogendobler et al. |
| 4,150,250 A | | 4/1979 | Undeberg |
| 4,153,320 A | | 5/1979 | Townshend |
| 4,156,554 A | | 5/1979 | Aujla |
| 4,165,911 A | | 8/1979 | Laudig |
| 4,168,921 A | | 9/1979 | Blanchard |
| 4,173,385 A | | 11/1979 | Fenn et al. |
| 4,174,875 A | | 11/1979 | Wilson et al. |
| 4,187,481 A | | 2/1980 | Boutros |
| 4,225,162 A | | 9/1980 | Dola |
| 4,227,765 A | | 10/1980 | Neumann et al. |
| 4,229,714 A | | 10/1980 | Yu |
| 4,250,348 A | | 2/1981 | Kitagawa |
| 4,280,749 A | | 7/1981 | Hemmer |
| 4,285,564 A | | 8/1981 | Spinner |
| 4,290,663 A | | 9/1981 | Fowler et al. |
| 4,296,986 A | | 10/1981 | Herrmann, Jr. |
| 4,307,926 A | | 12/1981 | Smith |
| 4,322,121 A | | 3/1982 | Riches et al. |
| 4,326,769 A | | 4/1982 | Dorsey et al. |
| 4,339,166 A | | 7/1982 | Dayton |
| 4,346,958 A | | 8/1982 | Blanchard |
| 4,354,721 A | | 10/1982 | Luzzi |
| 4,358,174 A | | 11/1982 | Dreyer |
| 4,373,767 A | | 2/1983 | Cairns |
| 4,389,081 A | | 6/1983 | Gallusser et al. |
| 4,400,050 A | | 8/1983 | Hayward |
| 4,407,529 A | | 10/1983 | Holman |
| 4,408,821 A | | 10/1983 | Forney, Jr. |
| 4,408,822 A | | 10/1983 | Nikitas |
| 4,412,717 A | | 11/1983 | Monroe |
| 4,421,377 A | | 12/1983 | Spinner |
| 4,426,127 A | | 1/1984 | Kubota |
| 4,444,453 A | | 4/1984 | Kirby et al. |
| 4,452,503 A | | 6/1984 | Forney, Jr. |
| 4,456,323 A | | 6/1984 | Pitcher |
| 4,462,653 A | | 7/1984 | Flederbach et al. |
| 4,464,000 A | | 8/1984 | Werth et al. |
| 4,464,001 A | | 8/1984 | Collins |
| 4,469,386 A | | 9/1984 | Ackerman |
| 4,470,657 A | | 9/1984 | Deacon |
| 4,484,792 A | | 11/1984 | Tengler et al. |
| 4,484,796 A | | 11/1984 | Sato et al. |
| 4,490,576 A | | 12/1984 | Bolante et al. |
| 4,506,943 A | | 3/1985 | Drogo et al. |
| 4,515,427 A | | 5/1985 | Smit |
| 4,525,017 A | | 6/1985 | Schildkraut et al. |
| 4,531,790 A | | 7/1985 | Selvin |
| 4,531,805 A | | 7/1985 | Werth |
| 4,533,191 A | | 8/1985 | Blackwood |
| 4,540,231 A | | 9/1985 | Forney, Jr. |
| RE31,995 E | | 10/1985 | Ball |
| 4,545,637 A | | 10/1985 | Bosshard et al. |
| 4,575,274 A | | 3/1986 | Hayward |
| 4,580,862 A | | 4/1986 | Johnson |
| 4,580,865 A | | 4/1986 | Fryberger |
| 4,583,811 A | | 4/1986 | McMills |
| 4,585,289 A | | 4/1986 | Bocher |
| 4,588,246 A | | 5/1986 | Schildkraut et al. |
| 4,593,964 A | | 6/1986 | Forney, Jr. et al. |
| 4,596,434 A | | 6/1986 | Saba et al. |
| 4,596,435 A | | 6/1986 | Bickford |
| 4,598,961 A | | 7/1986 | Cohen |
| 4,600,263 A | | 7/1986 | DeChamp et al. |
| 4,613,199 A | | 9/1986 | McGeary |
| 4,614,390 A | | 9/1986 | Baker |
| 4,616,900 A | | 10/1986 | Cairns |
| 4,632,487 A | | 12/1986 | Wargula |
| 4,634,213 A | | 1/1987 | Larsson et al. |
| 4,640,572 A | | 2/1987 | Conlon |
| 4,645,281 A | | 2/1987 | Burger |
| 4,646,038 A | | 2/1987 | Wanat |
| 4,650,228 A | | 3/1987 | McMills et al. |
| 4,655,159 A | | 4/1987 | McMills |
| 4,655,534 A | | 4/1987 | Stursa |
| 4,660,921 A | | 4/1987 | Hauver |
| 4,668,043 A | | 5/1987 | Saba et al. |
| 4,673,236 A | | 6/1987 | Musolff et al. |
| 4,674,818 A | | 6/1987 | McMills et al. |
| 4,676,577 A | | 6/1987 | Szegda |
| 4,682,832 A | | 7/1987 | Punako et al. |
| 4,684,201 A | | 8/1987 | Hutter |
| 4,688,876 A | | 8/1987 | Morelli |
| 4,688,878 A | | 8/1987 | Cohen et al. |
| 4,690,482 A | | 9/1987 | Chamberland et al. |
| 4,691,976 A | | 9/1987 | Cowen |
| 4,703,987 A | | 11/1987 | Gallusser et al. |
| 4,703,988 A | | 11/1987 | Raux et al. |
| 4,717,355 A | | 1/1988 | Mattis |
| 4,720,155 A | | 1/1988 | Schildkraut et al. |
| 4,731,282 A | | 3/1988 | Tsukagoshi et al. |
| 4,734,050 A | | 3/1988 | Negre et al. |
| 4,734,666 A | | 3/1988 | Ohya et al. |
| 4,737,123 A | | 4/1988 | Paler et al. |
| 4,738,009 A | | 4/1988 | Down et al. |
| 4,738,628 A | | 4/1988 | Rees |
| 4,746,305 A | | 5/1988 | Nomura |
| 4,747,786 A | | 5/1988 | Hayashi et al. |
| 4,749,821 A | | 6/1988 | Linton et al. |
| 4,755,152 A | | 7/1988 | Elliot et al. |
| 4,757,297 A | | 7/1988 | Frawley |
| 4,759,729 A | | 7/1988 | Kemppainen et al. |
| 4,761,146 A | | 8/1988 | Sohoel |
| 4,772,222 A | | 9/1988 | Audig et al. |
| 4,789,355 A | | 12/1988 | Lee |
| 4,797,120 A | | 1/1989 | Ulery |
| 4,806,116 A | | 2/1989 | Ackerman |
| 4,807,891 A | | 2/1989 | Neher |
| 4,808,128 A | | 2/1989 | Werth |
| 4,813,886 A | | 3/1989 | Roos et al. |
| 4,820,185 A | | 4/1989 | Moulin |
| 4,820,446 A | | 4/1989 | Prud'Homme |
| 4,834,675 A | | 5/1989 | Samchisen |
| 4,835,342 A | | 5/1989 | Guginsky |
| 4,836,801 A | | 6/1989 | Ramirez |
| 4,838,813 A | | 6/1989 | Pauza et al. |
| 4,854,893 A | | 8/1989 | Morris |
| 4,857,014 A | | 8/1989 | Alf et al. |
| 4,867,706 A | | 9/1989 | Tang |
| 4,869,679 A | | 9/1989 | Szegda |
| 4,874,331 A | | 10/1989 | Iverson |
| 4,892,275 A | | 1/1990 | Szegda |
| 4,902,246 A | | 2/1990 | Samchisen |
| 4,906,207 A | | 3/1990 | Banning et al. |
| 4,915,651 A | | 4/1990 | Bout |
| 4,921,447 A | | 5/1990 | Capp et al. |
| 4,923,412 A | | 5/1990 | Morris |
| 4,925,403 A | | 5/1990 | Zorzy |
| 4,927,385 A | | 5/1990 | Cheng |
| 4,929,188 A | * | 5/1990 | Lionetto ................ H01R 13/17 439/607.22 |
| 4,934,960 A | | 6/1990 | Capp et al. |
| 4,938,718 A | | 7/1990 | Guendel |
| 4,941,846 A | | 7/1990 | Guimond et al. |
| 4,952,174 A | | 8/1990 | Sucht et al. |
| 4,956,203 A | | 9/1990 | Kroupa |
| 4,957,456 A | | 9/1990 | Olson et al. |
| 4,971,727 A | | 11/1990 | Takahashi et al. |
| 4,973,265 A | | 11/1990 | Heeren |

(56) References Cited

U.S. PATENT DOCUMENTS 4,979,911 A 12/1990 Spencer
4,990,104 A 2/1991 Schieferly
4,990,105 A 2/1991 Karlovich
4,990,106 A 2/1991 Szegda
4,992,061 A 2/1991 Brush, Jr. et al.
5,002,503 A 3/1991 Campbell et al.
5,007,861 A 4/1991 Stirling
5,011,422 A 4/1991 Yeh
5,011,432 A 4/1991 Sucht et al.
5,021,010 A 6/1991 Wright
5,024,606 A 6/1991 Ming-Hwa
5,030,126 A 7/1991 Hanlon
5,037,328 A 8/1991 Karlovich
5,043,530 A 8/1991 Davies
5,046,964 A 9/1991 Welsh et al.
5,052,947 A 10/1991 Brodie et al.
5,055,060 A 10/1991 Down et al.
5,059,747 A 10/1991 Bawa et al.
5,062,804 A 11/1991 Jamet et al.
5,066,248 A 11/1991 Gaver, Jr. et al.
5,073,129 A 12/1991 Szegda
5,080,600 A 1/1992 Baker et al.
5,083,943 A 1/1992 Tarrant
5,120,260 A 6/1992 Jackson
5,127,853 A 7/1992 McMills et al.
5,131,862 A 7/1992 Gershfeld
5,137,470 A 8/1992 Doles
5,137,471 A 8/1992 Verespej et al.
5,141,448 A 8/1992 Mattingly et al.
5,141,451 A 8/1992 Down
5,149,274 A 9/1992 Gallusser et al.
5,154,636 A 10/1992 Vaccaro et al.
5,161,993 A 11/1992 Leibfried, Jr.
5,166,477 A 11/1992 Perin, Jr. et al.
5,169,323 A 12/1992 Kawai et al.
5,181,161 A 1/1993 Hirose et al.
5,183,417 A 2/1993 Bools
5,186,501 A 2/1993 Mano
5,186,655 A 2/1993 Glenday et al.
5,195,905 A 3/1993 Pesci
5,195,906 A 3/1993 Szegda
5,205,547 A 4/1993 Mattingly
5,205,761 A 4/1993 Nilsson
5,207,602 A 5/1993 McMills et al.
5,215,477 A 6/1993 Weber et al.
5,217,391 A 6/1993 Fisher, Jr.
5,217,393 A 6/1993 Del Negro et al.
5,221,216 A 6/1993 Gabany et al.
5,227,093 A 7/1993 Cole et al.
5,227,587 A 7/1993 Paterek
5,247,424 A 9/1993 Harris et al.
5,269,701 A 12/1993 Leibfried, Jr.
5,277,590 A 1/1994 Thomas et al.
5,283,853 A 2/1994 Szegda
5,284,449 A 2/1994 Vaccaro
5,294,864 A 3/1994 Do
5,295,864 A 3/1994 Birch et al.
5,316,494 A 5/1994 Flanagan et al.
5,318,459 A 6/1994 Shields
5,334,032 A 8/1994 Myers et al.
5,334,051 A 8/1994 Devine et al.
5,338,225 A 8/1994 Jacobsen et al.
5,342,218 A 8/1994 McMills et al.
5,354,217 A 10/1994 Gabel et al.
5,359,735 A 11/1994 Stockwell
5,362,250 A 11/1994 McMills et al.
5,371,819 A 12/1994 Szegda
5,371,821 A 12/1994 Szegda
5,371,827 A 12/1994 Szegda
5,380,211 A 1/1995 Kawaguchi et al.
5,389,005 A 2/1995 Kodama
5,393,244 A 2/1995 Szegda
5,397,252 A 3/1995 Wang
5,413,504 A 5/1995 Kloecker et al.
5,431,583 A 7/1995 Szegda
5,435,745 A 7/1995 Booth
5,439,386 A 8/1995 Ellis et al.
5,444,810 A 8/1995 Szegda
5,455,548 A 10/1995 Grandchamp et al.
5,456,611 A 10/1995 Henry et al.
5,456,614 A 10/1995 Szegda
5,464,661 A 11/1995 Lein et al.
5,466,173 A 11/1995 Down
5,470,257 A 11/1995 Szegda
5,474,478 A 12/1995 Ballog
5,490,033 A 2/1996 Cronin
5,490,801 A 2/1996 Fisher, Jr. et al.
5,494,454 A 2/1996 Johnsen
5,499,934 A 3/1996 Jacobsen et al.
5,501,616 A 3/1996 Holliday
5,516,303 A 5/1996 Yohn et al.
5,525,076 A 6/1996 Down
5,542,861 A 8/1996 Anhalt et al.
5,548,088 A 8/1996 Gray et al.
5,550,521 A 8/1996 Bernaud et al.
5,564,938 A 10/1996 Shenkal et al.
5,571,028 A 11/1996 Szegda
5,586,910 A 12/1996 Del Negro et al.
5,595,499 A 1/1997 Zander et al.
5,598,132 A 1/1997 Stabile
5,607,325 A 3/1997 Toma
5,620,339 A 4/1997 Gray et al.
5,632,637 A 5/1997 Diener
5,632,651 A 5/1997 Szegda
5,644,104 A 7/1997 Porter et al.
5,651,698 A 7/1997 Locati et al.
5,651,699 A 7/1997 Holliday
5,653,605 A 8/1997 Woehl et al.
5,667,405 A 9/1997 Holliday
5,681,172 A 10/1997 Moldenhauer
5,683,263 A 11/1997 Hsu
5,696,196 A 12/1997 DiLeo
5,702,263 A 12/1997 Baumann et al.
5,710,400 A 1/1998 Lorenz et al.
5,722,856 A 3/1998 Fuchs et al.
5,735,704 A 4/1998 Anthony
5,746,617 A 5/1998 Porter, Jr. et al.
5,746,619 A 5/1998 Harting et al.
5,769,652 A 6/1998 Wider
5,770,216 A 6/1998 Mitchnick et al.
5,775,927 A 7/1998 Wider
5,788,666 A 8/1998 Atanasoska
5,863,220 A 1/1999 Holliday
5,877,452 A 3/1999 McConnell
5,879,191 A 3/1999 Burris
5,882,226 A 3/1999 Bell et al.
5,921,793 A 7/1999 Phillips
5,938,465 A 8/1999 Fox, Sr.
5,944,548 A 8/1999 Saito
5,949,018 A 9/1999 Esker
5,949,029 A 9/1999 Crotzer et al.
5,957,716 A 9/1999 Buckley et al.
5,967,852 A 10/1999 Follingstad et al.
5,975,949 A 11/1999 Holliday et al.
5,975,951 A 11/1999 Burris et al.
5,977,841 A 11/1999 Lee et al.
5,997,350 A 12/1999 Burris et al.
6,010,349 A 1/2000 Porter, Jr.
6,019,635 A 2/2000 Nelson
6,022,237 A 2/2000 Esh
6,032,358 A 3/2000 Wild
6,042,422 A * 3/2000 Youtsey ............... H01R 9/0518
439/585
6,048,229 A 4/2000 Lazaro, Jr.
6,053,769 A 4/2000 Kubota et al.
6,053,777 A 4/2000 Boyle
6,083,053 A 7/2000 Anderson, Jr. et al.
6,089,903 A 7/2000 Stafford Gray et al.
6,089,912 A 7/2000 Tallis et al.
6,089,913 A 7/2000 Holliday
6,117,539 A 9/2000 Crotzer et al.
6,123,567 A 9/2000 McCarthy
6,146,197 A 11/2000 Holliday et al.
6,152,753 A 11/2000 Johnson et al.

(56) References Cited

U.S. PATENT DOCUMENTS

| | | | | |
|---|---|---|---|---|
| 6,153,830 | A | 11/2000 | Montena | |
| 6,180,221 | B1 | 1/2001 | Crotzer et al. | |
| 6,210,216 | B1 | 4/2001 | Tso-Chin et al. | |
| 6,210,222 | B1 | 4/2001 | Langham et al. | |
| 6,217,383 | B1 | 4/2001 | Holland et al. | |
| 6,239,359 | B1 | 5/2001 | Lilienthal, II et al. | |
| 6,241,553 | B1 | 6/2001 | Hsia | |
| 6,261,126 | B1 | 7/2001 | Stirling | |
| 6,262,374 | B1 | 7/2001 | Matsumoto et al. | |
| 6,267,612 | B1 | 7/2001 | Arcykiewicz et al. | |
| 6,271,464 | B1 | 8/2001 | Cunningham | |
| 6,331,123 | B1 | 12/2001 | Rodrigues | |
| 6,332,815 | B1 | 12/2001 | Bruce | |
| 6,358,077 | B1 | 3/2002 | Young | |
| 6,375,866 | B1 | 4/2002 | Paneccasio, Jr. et al. | |
| 6,383,019 | B1 | 5/2002 | Wild | |
| 6,386,915 | B1 | 5/2002 | Nelson | |
| D458,904 | S | 6/2002 | Montena | |
| 6,406,330 | B2 | 6/2002 | Bruce | |
| D460,739 | S | 7/2002 | Fox | |
| D460,740 | S | 7/2002 | Montena | |
| D460,946 | S | 7/2002 | Montena | |
| D460,947 | S | 7/2002 | Montena | |
| D460,948 | S | 7/2002 | Montena | |
| 6,416,847 | B1 | 7/2002 | Lein et al. | |
| 6,422,900 | B1 | 7/2002 | Hogan | |
| 6,425,782 | B1 | 7/2002 | Holland | |
| D461,166 | S | 8/2002 | Montena | |
| D461,167 | S | 8/2002 | Montena | |
| D461,778 | S | 8/2002 | Fox | |
| D462,058 | S | 8/2002 | Montena | |
| 6,439,899 | B1 | 8/2002 | Muzslay et al. | |
| D462,060 | S | 9/2002 | Montena | |
| D462,327 | S | 9/2002 | Montena | |
| 6,465,550 | B1 | 10/2002 | Kleyer et al. | |
| 6,468,100 | B1 | 10/2002 | Meyer et al. | |
| 6,491,546 | B1 | 12/2002 | Perry | |
| D468,696 | S | 1/2003 | Montena | |
| 6,506,083 | B1 | 1/2003 | Bickford et al. | |
| 6,530,807 | B2 | 3/2003 | Rodrigues et al. | |
| 6,540,531 | B2 | 4/2003 | Syed et al. | |
| 6,558,194 | B2 * | 5/2003 | Montena .............. | H01R 9/0521 439/585 |
| 6,572,419 | B2 | 6/2003 | Feye-Homann | |
| 6,576,833 | B2 | 6/2003 | Covaro et al. | |
| 6,619,876 | B2 | 9/2003 | Vaitkus et al. | |
| 6,634,906 | B1 | 10/2003 | Yeh | |
| 6,674,012 | B2 | 1/2004 | Beele | |
| 6,676,446 | B2 | 1/2004 | Montena | |
| 6,683,253 | B1 | 1/2004 | Lee | |
| 6,692,285 | B2 | 2/2004 | Islam | |
| 6,692,286 | B1 | 2/2004 | De Cet | |
| 6,712,631 | B1 | 3/2004 | Youtsey | |
| 6,716,041 | B2 | 4/2004 | Ferderer et al. | |
| 6,716,062 | B1 * | 4/2004 | Palinkas .............. | H01R 9/0521 439/700 |
| 6,733,336 | B1 | 5/2004 | Montena et al. | |
| 6,733,337 | B2 | 5/2004 | Kodaira | |
| 6,767,248 | B1 | 7/2004 | Hung | |
| 6,769,926 | B1 | 8/2004 | Montena | |
| 6,769,933 | B2 | 8/2004 | Bence et al. | |
| 6,780,068 | B2 | 8/2004 | Bartholoma et al. | |
| 6,786,767 | B1 | 9/2004 | Fuks et al. | |
| 6,790,081 | B2 | 9/2004 | Burris et al. | |
| 6,805,584 | B1 | 10/2004 | Chen | |
| 6,808,415 | B1 | 10/2004 | Montena | |
| 6,817,896 | B2 | 11/2004 | Derenthal | |
| 6,848,939 | B2 | 2/2005 | Stirling | |
| 6,848,940 | B2 | 2/2005 | Montena | |
| 6,862,181 | B1 | 3/2005 | Smith et al. | |
| 6,884,113 | B1 | 4/2005 | Montena | |
| 6,884,115 | B2 | 4/2005 | Malloy | |
| 6,929,508 | B1 | 8/2005 | Holland | |
| 6,939,169 | B2 | 9/2005 | Islam et al. | |
| 6,971,912 | B2 | 12/2005 | Montena et al. | |
| 7,021,695 | B2 | 4/2006 | Quindt et al. | |
| 7,021,965 | B1 | 4/2006 | Montena et al. | |
| 7,026,382 | B2 | 4/2006 | Akiba et al. | |
| 7,029,326 | B2 | 4/2006 | Montena | |
| 7,070,447 | B1 | 7/2006 | Montena | |
| 7,070,477 | B2 | 7/2006 | Montena | |
| 7,086,897 | B2 | 8/2006 | Montena | |
| 7,097,499 | B1 | 8/2006 | Purdy | |
| 7,102,868 | B2 | 9/2006 | Montena | |
| 7,114,990 | B2 | 10/2006 | Bence et al. | |
| 7,118,416 | B2 | 10/2006 | Montena et al. | |
| 7,125,283 | B1 | 10/2006 | Lin | |
| 7,131,868 | B2 | 11/2006 | Montena | |
| 7,144,271 | B1 | 12/2006 | Burris et al. | |
| 7,147,509 | B1 | 12/2006 | Burris et al. | |
| 7,156,696 | B1 | 1/2007 | Montena | |
| 7,161,785 | B2 | 1/2007 | Chawgo | |
| 7,229,303 | B2 | 6/2007 | Vermoesen et al. | |
| 7,252,546 | B1 | 8/2007 | Holland | |
| 7,255,598 | B2 | 8/2007 | Montena et al. | |
| 7,299,550 | B2 | 11/2007 | Montena | |
| 7,375,533 | B2 | 5/2008 | Gale | |
| 7,393,245 | B2 | 7/2008 | Palinkas et al. | |
| 7,452,239 | B2 | 11/2008 | Montena | |
| 7,455,550 | B1 | 11/2008 | Sykes | |
| 7,462,068 | B2 | 12/2008 | Amidon | |
| 7,476,127 | B1 | 1/2009 | Wei | |
| 7,479,035 | B2 | 1/2009 | Bence et al. | |
| 7,497,729 | B1 | 1/2009 | Wei | |
| 7,488,210 | B1 | 2/2009 | Burris et al. | |
| 7,494,355 | B2 | 2/2009 | Hughes et al. | |
| 7,507,117 | B2 | 3/2009 | Amidon | |
| 7,544,094 | B1 | 6/2009 | Paglia et al. | |
| 7,566,236 | B2 | 7/2009 | Malloy et al. | |
| 7,607,942 | B1 | 10/2009 | Van Swearingen | |
| 7,674,132 | B1 | 3/2010 | Chen | |
| 7,682,177 | B2 | 3/2010 | Berthet | |
| 7,727,011 | B2 | 6/2010 | Montena et al. | |
| 7,753,705 | B2 | 7/2010 | Montena | |
| 7,794,275 | B2 | 9/2010 | Rodrigues | |
| 7,806,725 | B1 | 10/2010 | Chen | |
| 7,811,133 | B2 | 10/2010 | Gray | |
| 7,824,216 | B2 | 11/2010 | Purdy | |
| 7,828,595 | B2 | 11/2010 | Mathews | |
| 7,830,154 | B2 | 11/2010 | Gale | |
| 7,833,053 | B2 | 11/2010 | Mathews | |
| 7,845,976 | B2 | 12/2010 | Mathews | |
| 7,845,978 | B1 | 12/2010 | Chen | |
| 7,850,487 | B1 | 12/2010 | Wel | |
| 7,857,661 | B1 | 12/2010 | Islam | |
| 7,887,354 | B2 | 2/2011 | Holliday | |
| 7,892,005 | B2 | 2/2011 | Haube | |
| 7,892,024 | B1 | 2/2011 | Chen | |
| 7,927,135 | B1 | 4/2011 | Wlos | |
| 7,950,958 | B2 | 5/2011 | Mathews | |
| 7,955,126 | B2 | 6/2011 | Bence et al. | |
| 8,029,315 | B2 | 10/2011 | Purdy et al. | |
| 8,071,174 | B2 | 12/2011 | Krenceski | |
| 8,113,875 | B2 | 2/2012 | Malloy et al. | |
| 8,157,589 | B2 | 4/2012 | Krenceski et al. | |
| 8,172,612 | B2 | 5/2012 | Bence et al. | |
| 8,192,237 | B2 | 6/2012 | Purdy et al. | |
| 8,287,320 | B2 | 10/2012 | Purdy et al. | |
| 8,313,345 | B2 | 11/2012 | Purdy | |
| 8,313,353 | B2 | 11/2012 | Purdy et al. | |
| 8,337,229 | B2 | 12/2012 | Montena | |
| 8,366,481 | B2 | 2/2013 | Ehret et al. | |
| 8,529,279 | B2 | 9/2013 | Montena | |
| 8,597,041 | B2 * | 12/2013 | Purdy ................ | H01R 13/6592 439/322 |
| 8,876,550 | B1 | 11/2014 | Krenceski et al. | |
| 8,882,538 | B1 | 11/2014 | Krenceski et al. | |
| 9,225,083 | B2 | 12/2015 | Krenceski et al. | |
| 9,312,611 | B2 | 4/2016 | Krenceski et al. | |
| 9,570,859 | B2 | 2/2017 | Krenceski et al. | |
| 10,038,284 | B2 | 7/2018 | Krenceski et al. | |
| 10,446,983 | B2 | 10/2019 | Krenceski et al. | |
| 2002/0010415 | A1 | 1/2002 | Simon | |
| 2002/0013088 | A1 | 1/2002 | Rodrigues et al. | |

(56) References Cited

U.S. PATENT DOCUMENTS

| | | | |
|---|---|---|---|
| 2002/0038720 A1 | 4/2002 | Kai et al. | |
| 2003/0214370 A1 | 11/2003 | Allison et al. | |
| 2003/0224657 A1 | 12/2003 | Malloy | |
| 2004/0018312 A1 | 1/2004 | Halladay | |
| 2004/0077215 A1 | 4/2004 | Palinkas et al. | |
| 2004/0102089 A1 | 5/2004 | Chee | |
| 2004/0209516 A1 | 10/2004 | Burris et al. | |
| 2004/0219833 A1 | 11/2004 | Burris et al. | |
| 2004/0229504 A1 | 11/2004 | Liu | |
| 2005/0042919 A1 | 2/2005 | Montena | |
| 2005/0098344 A1 | 5/2005 | Ysbrand | |
| 2005/0109994 A1 | 5/2005 | Matheson et al. | |
| 2005/0181652 A1 | 8/2005 | Montena et al. | |
| 2005/0181668 A1 | 8/2005 | Montena et al. | |
| 2005/0208827 A1 | 9/2005 | Burris et al. | |
| 2005/0233636 A1 | 10/2005 | Rodrigues et al. | |
| 2006/0099853 A1 | 5/2006 | Sattele et al. | |
| 2006/0110977 A1 | 5/2006 | Mathews | |
| 2006/0154519 A1 | 7/2006 | Montena | |
| 2006/0166552 A1 | 7/2006 | Bence | |
| 2007/0026734 A1 | 2/2007 | Bence et al. | |
| 2007/0077360 A1 | 4/2007 | Kashiwagi et al. | |
| 2007/0123101 A1 | 5/2007 | Palinkas | |
| 2007/0155232 A1 | 7/2007 | Burris et al. | |
| 2007/0175027 A1 | 8/2007 | Khemakhem et al. | |
| 2007/0243759 A1 | 10/2007 | Rodrigues et al. | |
| 2007/0281542 A1 | 12/2007 | Palinkas et al. | |
| 2008/0047703 A1 | 2/2008 | Stoesz et al. | |
| 2008/0102696 A1 | 5/2008 | Montena | |
| 2008/0251270 A1 | 10/2008 | Lee et al. | |
| 2008/0289470 A1 | 11/2008 | Aston | |
| 2008/0311790 A1 | 12/2008 | Malloy et al. | |
| 2009/0029590 A1 | 1/2009 | Sykes et al. | |
| 2009/0098770 A1 | 4/2009 | Bence et al. | |
| 2009/0176396 A1 | 7/2009 | Mathews | |
| 2009/0220794 A1 | 9/2009 | O'Neill et al. | |
| 2010/0055978 A1 | 3/2010 | Montena | |
| 2010/0081321 A1 | 4/2010 | Malloy et al. | |
| 2010/0081322 A1 | 4/2010 | Malloy et al. | |
| 2010/0105246 A1 | 4/2010 | Burris et al. | |
| 2010/0233901 A1 | 9/2010 | Wild et al. | |
| 2010/0233902 A1 | 9/2010 | Youtsey | |
| 2010/0239871 A1 | 9/2010 | Scheffer et al. | |
| 2010/0255719 A1 | 10/2010 | Purdy | |
| 2010/0255721 A1 | 10/2010 | Purdy | |
| 2010/0279548 A1 | 11/2010 | Montena et al. | |
| 2010/0297871 A1 | 11/2010 | Haube | |
| 2010/0297875 A1 | 11/2010 | Purdy et al. | |
| 2011/0053413 A1 | 3/2011 | Mathews | |
| 2011/0117774 A1 | 5/2011 | Malloy et al. | |
| 2011/0143567 A1 | 6/2011 | Purdy et al. | |
| 2011/0200834 A1 | 8/2011 | Krenceski | |
| 2011/0230089 A1 | 9/2011 | Amidon et al. | |
| 2011/0230091 A1 | 9/2011 | Krenceski et al. | |
| 2011/0232937 A1 | 9/2011 | Montena et al. | |
| 2012/0202378 A1 | 8/2012 | Krenceski et al. | |
| 2013/0102189 A1 | 4/2013 | Montena | |
| 2021/0194184 A1* | 6/2021 | Krenceski | H01R 9/0524 |

FOREIGN PATENT DOCUMENTS

| | | |
|---|---|---|
| CN | 201149937 | 11/2008 |
| CN | 201178226 | 1/2009 |
| CN | 201178228 | 1/2009 |
| DE | 102289 | 7/1897 |
| DE | 1117687 | 11/1961 |
| DE | 1191880 | 4/1965 |
| DE | 047931 | 5/1966 |
| DE | 1515398 | 4/1970 |
| DE | 2225764 | 12/1972 |
| DE | 2221936 | 11/1973 |
| DE | 2261973 | 6/1974 |
| DE | 3211008 | 10/1983 |
| DE | 90016084 | 4/1990 |
| DE | 4439852 | 5/1996 |
| DE | 19957518 | 9/2001 |
| EP | 0072104 | 2/1983 |
| EP | 0116157 | 8/1984 |
| EP | 0167738 | 1/1986 |
| EP | 0265276 | 4/1988 |
| EP | 0428424 | 5/1991 |
| EP | 1191268 | 3/2002 |
| EP | 1501159 | 1/2005 |
| EP | 1548898 | 6/2005 |
| EP | 1701410 | 9/2006 |
| EP | 1717905 | 11/2006 |
| FR | 2232846 | 1/1975 |
| FR | 2234680 | 1/1975 |
| FR | 2312918 | 12/1976 |
| FR | 2462798 | 2/1981 |
| FR | 2494508 | 5/1982 |
| GB | 0589697 | 6/1947 |
| GB | 1087228 | 10/1967 |
| GB | 1270846 | 4/1972 |
| GB | 1401373 | 7/1975 |
| GB | 2019665 | 10/1979 |
| GB | 2079549 | 1/1982 |
| GB | 2252677 | 8/1992 |
| GB | 2264201 | 8/1993 |
| GB | 2331634 | 5/1999 |
| GB | 2450248 | 12/2008 |
| JP | S5840375 | 3/1983 |
| JP | 3074864 | 8/2000 |
| JP | 2002-015823 | 1/2002 |
| JP | 4503793 | 1/2002 |
| JP | 2002075556 | 3/2002 |
| JP | 3280369 | 5/2002 |
| JP | 2004176005 | 6/2004 |
| KR | 2006100622526 | 9/2006 |
| TW | 427044 | 3/2001 |
| TW | I289958 | 11/2007 |
| WO | 8700351 | 1/1987 |
| WO | 0186756 | 11/2001 |
| WO | 02069457 | 9/2002 |
| WO | 2004013883 | 2/2004 |
| WO | 2006081141 | 8/2006 |
| WO | 2008066995 | 6/2008 |

OTHER PUBLICATIONS

Inter Partes Review Case IPR2022-00718 of U.S. Pat. No. 10,965,063 (Claims 1-6, 10-17, 20, and 21), Patent Owner's Sur-Reply, Paper 28, 41 pages, May 23, 2023.

Inter Partes Review Case IPR2022-00718 of U.S. Pat. No. 10,965,063 (Claims 1-6, 10-17, 20, and 21), Record of Oral Hearing, Paper 35, 108 pages, Sep. 18, 2022.

Inter Partes Review Case IPR2022-00719 of U.S. Pat. No. 10,446,983 (Claims 1-5, 8-15, and 18), Petitioner's Reply, Paper 22, 39 pages, Apr. 18, 2023.

Inter Partes Review Case IPR2022-00719 of U.S. Pat. No. 10,446,983 (Claims 1-5, 8-15, and 18), Patent Owner's Sur-Reply, Paper 27, 41 pages, May 23, 2023.

Inter Partes Review Case IPR2022-00719 of U.S. Pat. No. 10,446,983 (Claims 1-5, 8-15, and 18), Record of Oral Hearing, Paper 34, 108 pages, Sep. 18, 2022.

Inter Partes Review Case IPR2022-00720 of U.S. Pat. No. 10,038,284 (Claims 29-33, 36-43, and 46), Petitioner's Reply, Paper 22, 39 pages, Apr. 18, 2023.

Inter Partes Review Case IPR2022-00720 of U.S. Pat. No. 10,038,284 (Claims 29-33, 36-43, and 46), Patent Owner's Sur-Reply, Paper 27, 41 pages, May 23, 2023.

Inter Partes Review Case IPR2022-00720 of U.S. Pat. No. 10,038,284 (Claims 29-33, 36-43, and 46), Record of Oral Hearing, Paper 34, 108 pages, Sep. 18, 2022.

Inter Partes Review Case IPR2022-00721 of U.S. Pat. No. 9,225,083 (Claims 1-6, 8-19, 21-33, 35-43, 45-50, and 52-62), Petitioner's Reply, Paper 22, 39 pages, Apr. 18, 2023.

Inter Partes Review Case IPR2022-00721 of U.S. Pat. No. 9,225,083 (Claims 1-6, 8-19, 21-33, 35-43, 45-50, and 52-62), Patent Owner's Sur-Reply, Paper 27, 41 pages, May 23, 2023.

(56) References Cited

OTHER PUBLICATIONS

Inter Partes Review Case IPR2022-00721 of U.S. Pat. No. 9,225,083 (Claims 1-6, 8-19, 21-33, 35-43, 45-50, and 52-62), Record of Oral Hearing, Paper 34, 108 pages, Sep. 18, 2022.

U.S. Reexamination Control No. 95/001,689 of U.S. Pat. No. 7,833,053, filed Jul. 18, 2011.

U.S. Reexamination Control No. 95/001,691 of U.S. Pat. No. 7,828,595, filed Jul. 18, 2011.

Inter Partes Review Case IPR2022-00718 of U.S. Pat. No. 10,965,063 (Claims 1-6, 10-17, 20, and 21), Petition for Inter Partes Review of U.S. Pat. No. 10,965,063, Paper 2, 105 pages, Mar. 18, 2022.

Inter Partes Review Case IPR2022-00718 of U.S. Pat. No. 10,965,063 (Claims 1-6, 10-17, 20, and 21), Patent Owner Preliminary Response, Paper 6, 89 pages, Jul. 26, 2022.

Inter Partes Review Case IPR2022-00718 of U.S. Pat. No. 10,965,063 (Claims 1-6, 10-17, 20, and 21), Petitioner's Reply to Patent Owner's Preliminary Response, Paper 8, 16 pages, Aug. 31, 2022.

Inter Partes Review Case IPR2022-00718 of U.S. Pat. No. 10,965,063 (Claims 1-6, 10-17, 20, and 21), Patent Owner's Sur-Reply to Petitioner's Reply to the Preliminary Response, Paper 10, 12 pages, Sep. 7, 2022.

Inter Partes Review Case IPR2022-00718 of U.S. Pat. No. 10,965,063 (Claims 1-6, 10-17, 20, and 21), Institution Decision: Grant, Paper 11, 73 pages, Oct. 24, 2022.

Inter Partes Review Case IPR2022-00718 of U.S. Pat. No. 10,965,063 (Claims 1-6, 10-17, 20, and 21), Patent Owner Response, Paper 17, 92 pages, Jan. 24, 2023.

Inter Partes Review Case IPR2022-00719 of U.S. Pat. No. 10,446,983 (Claims 1-5, 8-15, and 18), Petition for Inter Partes Review of U.S. Pat. No. 10,446,983, Paper 2, 102 pages, Mar. 18, 2022.

Inter Partes Review Case IPR2022-00719 of U.S. Pat. No. 10,446,983 (Claims 1-5, 8-15, and 18), Patent Owner Preliminary Response, Paper 6, 87 pages, Jul. 27, 2022.

Inter Partes Review Case IPR2022-00719 of U.S. Pat. No. 10,446,983 (Claims 1-5, 8-15, and 18), Petitioner's Reply to Patent Owner's Preliminary Response, Paper 8, 16 pages, Aug. 31, 2022.

Inter Partes Review Case IPR2022-00719 of U.S. Pat. No. 10,446,983 (Claims 1-5, 8-15, and 18), Patent Owner's Sur-Reply to Petitioner's Reply to the Preliminary Response, Paper 10, 12 pages, Sep. 7, 2022.

Inter Partes Review Case IPR2022-00719 of U.S. Pat. No. 10,446,983 (Claims 1-5, 8-15, and 18), Institution Decision: Grant, Paper 11, 75 pages, Oct. 24, 2022.

Inter Partes Review Case IPR2022-00719 of U.S. Pat. No. 10,446,983 (Claims 1-5, 8-15, and 18), Patent Owner Response, Paper 17, 92 pages, Jan. 24, 2023.

Inter Partes Review Case IPR2022-00720 of U.S. Pat. No. 10,038,284 (Claims 29-33, 36-43, and 46), Petition for Inter Partes Review of U.S. Pat. No. 10,038,284, Paper 2, 100 pages, Mar. 18, 2022.

Inter Partes Review Case IPR2022-00720 of U.S. Pat. No. 10,038,284 (Claims 29-33, 36-43, and 46), Patent Owner Preliminary Response, Paper 6, 87 pages, Jul. 27, 2022.

Inter Partes Review Case IPR2022-00720 of U.S. Pat. No. 10,038,284 (Claims 29-33, 36-43, and 46), Petitioner's Reply to Patent Owner's Preliminary Response, Paper 8, 16 pages, Aug. 31, 2022.

Inter Partes Review Case IPR2022-00720 of U.S. Pat. No. 10,038,284 (Claims 29-33, 36-43, and 46), Patent Owner's Sur-Reply to Petitioner's Reply to the Preliminary Response, Paper 10, 12 pages, Sep. 7, 2022.

Inter Partes Review Case IPR2022-00720 of U.S. Pat. No. 10,038,284 (Claims 29-33, 36-43, and 46), Institution Decision: Grant, Paper 11, 72 pages, Oct. 24, 2022.

Inter Partes Review Case IPR2022-00720 of U.S. Pat. No. 10,038,284 (Claims 29-33, 36-43, and 46), Patent Owner Response, Paper 17, 92 pages, Jan. 24, 2023.

Inter Partes Review Case IPR2022-00721 of U.S. Pat. No. 9,225,083 (Claims 1-6, 8-19, 21-33, 35-43, 45-50, and 52-62), Petition for Inter Partes Review of U.S. Pat. No. 9,225,083, Paper 2, 120 pages, Mar. 18, 2022.

Inter Partes Review Case IPR2022-00721 of U.S. Pat. No. 9,225,083 (Claims 1-6, 8-19, 21-33, 35-43, 45-50, and 52-62), Patent Owner Preliminary Response, Paper 6, 87 pages, Jul. 28, 2022.

Inter Partes Review Case IPR2022-00721 of U.S. Pat. No. 9,225,083 (Claims 1-6, 8-19, 21-33, 35-43, 45-50, and 52-62), Petitioner's Reply to Patent Owner's Preliminary Response, Paper 8, 16 pages, Aug. 31, 2022.

Inter Partes Review Case IPR2022-00721 of U.S. Pat. No. 9,225,083 (Claims 1-6, 8-19, 21-33, 35-43, 45-50, and 52-62), Patent Owner's Sur-Reply to Petitioner's Reply to the Preliminary Response, Paper 10, 12 pages, Sep. 7, 2022.

Inter Partes Review Case IPR2022-00721 of U.S. Pat. No. 9,225,083 (Claims 1-6, 8-19, 21-33, 35-43, 45-50, and 52-62), Institution Decision: Grant, Paper 11, 75 pages, Oct. 26, 2022.

Inter Partes Review Case IPR2022-00721 of U.S. Pat. No. 9,225,083 (Claims 1-6, 8-19, 21-33, 35-43, 45-50, and 52-62), Patent Owner Response, Paper 17, 92 pages, Jan. 24, 2023.

Digicon AVL Connector. ARRIS Group Inc. [online]. 3 pages. [retrieved on Apr. 22, 2010]. Retrieved from the Internet<URL:http://www.arrisi.com/special/digiconAVL.asp>.

PCT/US2010/029593 International Filing Date: Apr. 1, 2010; International Search Report and Written Opinion; dated Nov. 12, 2010; 10 pages.

Flexible, High Temperature, Electrically Conductive Adhesive. Creative Materials, Inc. [online]. 1 page. [retrieved on Jun. 22, 2011]. Retrieved from the Internet:<URL: http://server.creativematerials.com/datasheets/DS.sub.--102.sub.-32.pdf&-gt;.

*PCT International, Inc.*, v. *John Mezzalingua Associates, Inc.*; U.S. District Court District of Delaware (Wilmington); Civil Docket for Case #: 1:10-cv-00059-LPS. No decision yet.

*John Mezzalingua Associates, Inc.*, v. *PCT International, Inc.*; U.S. District Court Western District of Texas (San Antonio); Civil Docket for Case #: 5:09-cv-00410-WRF. No decision yet. Defendant's Answer to Plaintiff's First Amended Complaint, Affirmative Defenses and Counterclaims. pp. 1-53.

*John Mezzalingua Associates, Inc.*, v. *PCT International, Inc.*; U.S. District Court Western District of Texas (San Antonio); Civil Docket for Case #: 5:09-cv-00410-WRF. No decision yet. Expert Report of Barry Grossman (Redacted). 61 pages.

*John Mezzalingua Associates, Inc.*, v. *PCT International, Inc.*; U.S. District Court Western District of Texas (San Antonio); Civil Docket for Case #: 5:09-cv-00410-WRF. No decision yet. Defendant/Counterclaimant PCT International, Inc.'s FirstSupplemental Answers and Objections to Plaintiff/Counterclaim Defendant John Mezzalingua Associates, Inc. D/B/A PPC's Amended Second Set of Interrogatories (Nos. 4-17). pp. 1-11.

*John Mezzalingua Associates, Inc.*, v. *PCT International, Inc.*; U.S. District Court Western District of Texas (San Antonio); Civil Docket for Case #: 5:09-cv-00410-WRF. No decision yet. Defendant's Response and Objections to Plaintiff's AmendedSecond Set of Interrogatories (Nos. 4-17). pp. 1-20.

Supplementary European Search Report. EP05813878, dated Feb. 6, 2009. 11 pages.

Application No. EP05813878.5-2214 / Patent No. 1815559. Summons to Attend Oral Proceedings Pursuant to Rule 115(1) EPC on Oct. 28, 2010. Dated: Jun. 7, 2010. 12 pages.

*John Mezzalingua Associates, Inc.*, v. *Thomas & Betts Corporation and Belden Inc.*; U.S. District Court Western District of New York; Civil Action No. 11-CV-6327CJS. David Morrocco's Declaration. Dated: Oct. 14, 2011. 4 pages.

*John Mezzalingua Associates, Inc.*, v. *Thomas & Betts Corporation and Belden Inc.*; U.S. District Court Western District of New York; Civil Action No. 6:11-CV-06327-CJS. Roger Phillips' Declaration. Dated: Oct. 28, 2011. 2 pages.

*John Mezzalingua Associates, Inc.*, v. *Thomas & Betts Corporation and Belden Inc.*; U.S. District Court Western District of New York; Civil Action No. 6:11-CV-06327-CJS-MWP. Reply Brief in Support of Defendant's Motion to Stay orAdministrativelyClose. Dated: Oct. 28, 2011. 14 pages.

LIT10; Defendant's Disclosure of Preliminary Invalidity Contentions, Served Oct. 31, 2013, *PPC Broadband, Inc. d/b/a PPC* v.

(56) References Cited

OTHER PUBLICATIONS

*Times Fiber Communications, Inc.*, United States District Court Northern district of New York, Civil Action No. 5:13-CV-0460-TJM-DEP, 48 pages.
Taiwan Intellectual Property Office, Office Action dated Dec. 8, 2014 from Taiwanese Patent Appl. No. 99109977 (total 2 pgs.).
US. Reexamination Control No. 95/002,400 of U.S. Pat. No. 8,192,237, filed Sep. 15, 2012, Right of Notice of Appeal mailed Aug. 5, 2015, 57 pages.
Inter Partes Review Case IPR2014-00440—U.S. Pat. No. 8,597,041 (Claims 1, 8, 9, 11, 18-26, and 29), Decision—Institution of Inter Partes Review, Paper 10, Entered on Aug. 19, 2014, 23 pages.
Inter Partes Review Case IPR2014-00441—U.S. Pat. No. 8,562,366 (Claims 31, 37, 39, 41, 42, 55, 56), Decision—Institution of Inter Partes Review, Paper 10, Entered on Aug. 19, 2014, 29 Pages.
Inter Partes Review Case IPR2013-00340—U.S. Pat. No. 8,323,060 (Claims 1-9), Final Written Decision, Paper 79, Entered on Nov. 21, 2014, 56 pages.
Inter Partes Review Case IPR2013-00342—U.S. Pat. No. 8,323,060 (Claims 10-25), Final Written Decision, Paper 49, Entered on Nov. 21, 2014, 32 pages.
Inter Partes Review Case IPR2013-00343—U.S. Pat. No. 8,313,353 (Claims 1-6), Judgment, Paper 27, Entered on Apr. 15, 2014, 3 pages.
Inter Partes Review Case IPR2013-00345—U.S. Pat. No. 8,313,353 (Claims 7-27), Final Written Decision, Paper 76, Entered on Nov. 21, 2014, 57 pages.
Inter Partes Review Case IPR2013-00346—U.S. Pat. No. 8,287,320 (Claims 1-8, 10-16, and 18-31), Final Written Decision, Paper 76, Entered on Nov. 21, 2014, 51 pages.
Inter Partes Review Case IPR2013-00347—U.S. Pat. No. 8,287,320 (Claims 9, 17, and 32), Final Written Decision, Paper 77, Entered on Nov. 21, 2014, 44 pages.
Brazilian Preliminary Office Action dated Sep. 15, 2020 in corresponding Brazilian Application No. PI1006560-1, 4 pages.
European Office Action dated Jul. 3, 2018 in corresponding European Application No. 16201989.7, 4 pages.
European Office Action dated Dec. 11, 2019 in corresponding European Application No. 16201989.7, 4 pages.
Indian Office Action dated Jan. 11, 2018 in corresponding Indian Application No. 8459/DELNP/2011, 5 pages.
International Search Report and Written Opinion dated Nov. 12, 2010 in corresponding International Application No. PCT/US2010/029212, 11 pages.
International Search Report and Written Opinion dated Oct. 29, 2010 in corresponding International Application No. PCT/US2010/029587, 7 pages.
Written Opinion dated Jan. 5, 2006 in corresponding International Application No. PCT/US2005/037791, 3 pages.
Inter Partes Review Case IPR2022-00718 of U.S. Pat. No. 10,965,063 (Claims 1-6, 10-17, 20, and 21), Final Written Decision, Paper 36, 101 pages, Oct. 23, 2023.
Inter Partes Review Case IPR2022-00718 of U.S. Pat. No. 10,965,063 (Claims 1-6, 10-17, 20, and 21), Patent Owner Request for Rehearing, Paper 37, 20 pages, Nov. 22, 2023.
Inter Partes Review Case IPR2022-00719 of U.S. Pat. No. 10,446,983 (Claims 1-5, 8-15, and 18), Final Written Decision, Paper 35, 100 pages, Oct. 23, 2023.
Inter Partes Review Case IPR2022-00719 of U.S. Pat. No. 10,446,983 (Claims 1-5, 8-15, and 18), Patent Owner Request for Rehearing, Paper 36, 20 pages, Nov. 22, 2023.
Inter Partes Review Case IPR2022-00720 of U.S. Pat. No. 10,038,284 (Claims 29-33, 36-43, and 46), Final Written Decision, Paper 35, 99 pages, Oct. 23, 2023.
Inter Partes Review Case IPR2022-00720 of U.S. Pat. No. 10,038,284 (Claims 29-33, 36-43, and 46), Patent Owner Request for Rehearing, Paper 36, 20 pages, Nov. 22, 2023.
Inter Partes Review Case IPR2022-00721 of U.S. Pat. No. 9,225,083 (Claims 1-6, 8-19, 21-33, 35-43, 45-50, and 52-62), Final Written Decision, Paper 35, 104 pages, Oct. 24, 2023.
Inter Partes Review Case IPR2022-00721 of U.S. Pat. No. 9,225,083 (Claims 1-6, 8-19, 21-33, 35-43, 45-50, and 52-62), Patent Owner Request for Rehearing, Paper 36, 20 pages, Nov. 22, 2023.

* cited by examiner

CONNECTOR HAVING A GROUNDING MEMBER

CROSS REFERENCE TO RELATED APPLICATIONS

This is a continuation of U.S. patent application Ser. No. 17/196,545, filed on Mar. 9, 2021, which is a continuation of U.S. patent application Ser. No. 16/653,713, filed on Oct. 15, 2019, now U.S. Pat. No. 10,965,063, which is a continuation of U.S. patent application Ser. No. 16/050,726, filed on Jul. 31, 2018, now U.S. Pat. No. 10,446,983, which is a continuation of U.S. patent application Ser. No. 15/431,018, filed on Feb. 13, 2017, now U.S. Pat. No. 10,038,284, which is a continuation of U.S. patent application Ser. No. 15/094,451 filed on Apr. 8, 2016, now U.S. Pat. No. 9,570,859, which is a continuation of U.S. patent application Ser. No. 13/448,937, filed on Apr. 17, 2012, now U.S. Pat. No. 9,312,611, which is a continuation of U.S. patent application Ser. No. 13/118,617, filed on May 31, 2011, now U.S. Pat. No. 8,157,589, which is a continuation-in-part of both U.S. patent application Ser. No. 12/418,103, filed on Apr. 3, 2009, now U.S. Pat. No. 8,071,174, and U.S. patent application Ser. No. 12/941,709, filed on Nov. 8, 2010, now U.S. Pat. No. 7,950,958, which U.S. patent application Ser. No. 12/941,709 is a continuation of U.S. patent application Ser. No. 12/397,087, filed on Mar. 3, 2009, now U.S. Pat. No. 7,828,595, which is a continuation of U.S. patent application Ser. No. 10/997,218, filed on Nov. 24, 2004, abandoned. The entire contents of such applications are hereby incorporated by reference.

BACKGROUND

Technical Field

This following relates generally to the field of connectors for coaxial cables. More particularly, this invention provides for a coaxial cable connector comprising at least one conductively coated member and a method of use thereof.

Related Art

Broadband communications have become an increasingly prevalent form of electromagnetic information exchange and coaxial cables are common conduits for transmission of broadband communications. Connectors for coaxial cables are typically connected onto complementary interface ports to electrically integrate coaxial cables to various electronic devices. In addition, connectors are often utilized to connect coaxial cables to various communications modifying equipment such as signal splitters, cable line extenders and cable network modules.

To help prevent the introduction of electromagnetic interference, coaxial cables are provided with an outer conductive shield. In an attempt to further screen ingress of environmental noise, typical connectors are generally configured to contact with and electrically extend the conductive shield of attached coaxial cables. Moreover, electromagnetic noise can be problematic when it is introduced via the connective juncture between an interface port and a connector. Such problematic noise interference is disruptive where an electromagnetic buffer is not provided by an adequate electrical and/or physical interface between the port and the connector. Weathering also creates interference problems when metallic components corrode, deteriorate or become galvanically incompatible thereby resulting in intermittent contact and poor electromagnetic shielding.

Accordingly, there is a need in the field of coaxial cable connectors for an improved connector design.

SUMMARY

The following provides an apparatus for use with coaxial cable connections that offers improved reliability.

A first general aspect relates to a connector for coupling an end of a coaxial cable, the coaxial cable having a center conductor surrounded by a dielectric, the dielectric being surrounded by a conductive grounding shield, the conductive grounding shield being surrounded by a protective outer jacket, said connector comprising a connector body, a coupling member, and a conductive seal, the conductive seal electrically coupling the connector body and the coupling member.

A second general aspect relates to a connector for coupling an end of a coaxial cable, the coaxial cable having a center conductor surrounded by a dielectric, the dielectric being surrounded by a conductive grounding shield, the conductive grounding shield being surrounded by a protective outer jacket, said connector comprising a post, having a first end and a second end, the first end configured to be inserted into an end of the coaxial cable around the dielectric and under the conductive grounding shield thereof. Moreover, the connector comprises a connector body, operatively attached to the post, and a conductive member, located proximate the second end of the post, wherein the conductive member facilitates grounding of the coaxial cable.

A third general aspect relates to a connector for coupling an end of a coaxial cable, the coaxial cable having a center conductor surrounded by a dielectric, the dielectric being surrounded by a conductive grounding shield, the conductive grounding shield being surrounded by a protective outer jacket, said connector comprising a connector body, having a first end and a second end, said first end configured to deformably compress against and seal a received coaxial cable, a post, operatively attached to said connector body, a coupling member, operatively attached to said post, and a conductive member, located proximate the second end of the connector body, wherein the conductive member completes a shield preventing ingress of electromagnetic noise into the connector.

A fourth general aspect relates to a connector for coupling an end of a coaxial cable, the coaxial cable having a center conductor surrounded by a dielectric, the dielectric being surrounded by a conductive grounding shield, the conductive grounding shield being surrounded by a protective outer jacket, said connector comprising a connector body a coupling member, and means for conductively sealing and electrically coupling the connector body and the coupling member.

A fifth general aspect relates to a method for grounding a coaxial cable through a connector, the coaxial cable having a center conductor surrounded by a dielectric, the dielectric being surrounded by a conductive grounding shield, the conductive grounding shield being surrounded by a protective outer jacket, said method comprising providing a connector, wherein the connector includes a connector body, a post having a first end and a second end, and a conductive member located proximate the second end of said post, fixedly attaching the coaxial cable to the connector, and advancing the connector onto an interface port until a surface of the interface port mates with the conductive member facilitating grounding through the connector.

A sixth general aspect relates to for a method for electrically coupling a coaxial cable and a connector, the coaxial cable having a center conductor surrounded by a dielectric, the dielectric being surrounded by a conductive grounding shield, the conductive grounding shield being surrounded by a protective outer jacket, said method comprising providing a connector, wherein the connector includes a connector body, a coupling member, and a conductive member electrically coupling and physically sealing the connector body and the coupling member, fixedly attaching the coaxial cable to the connector, and completing an electromagnetic shield by threading the nut onto a conductive interface port.

A seventh general aspect relates to a connector for coupling an end of a coaxial cable and for facilitating electrical connection with a male coaxial cable interface port, the coaxial cable having a center conductor surrounded by a dielectric, the dielectric being surrounded by a conductive grounding shield, the conductive grounding shield being surrounded by a protective outer jacket, the connector comprising a connector body, configured to receive at least a portion of the coaxial cable, a post, having a mating edge, the post configured to electrically contact the conductive grounding shield of the coaxial cable, and a conductively coated member, configured to reside within a coupling member of the connector, the conductively coated member positioned to physically and electrically contact the mating edge of the post to facilitate grounding of the connector through the conductively coated member and the post to the cable when the connector is threadably advanced onto an interface port and to help shield against ingress of unwanted electromagnetic interference.

An eighth general aspect relates to connector for coupling an end of a coaxial cable and for facilitating electrical connection with a male coaxial cable interface port, the coaxial cable having a center conductor surrounded by a dielectric, the dielectric being surrounded by a conductive grounding shield, the conductive grounding shield being surrounded by a protective outer jacket, the connector comprising a connector body, configured to receive at least a portion of the coaxial cable, a post, having a mating edge, the post configured to electrically contact the conductive grounding shield of the coaxial cable, and a conductively coated member, configured to reside within a coupling member of the connector, the conductively coated member positioned to physically and electrically contact an inner surface of the coupling member to facilitate electrical continuity between the coupling member and the post to help shield against ingress of unwanted electromagnetic interference.

A ninth general aspect relates to a connector for coupling an end of a coaxial cable and facilitating electrical connection with a male coaxial cable interface port, the coaxial cable having a center conductor surrounded by a dielectric, the dielectric being surrounded by a conductive grounding shield, the conductive grounding shield being surrounded by a protective outer jacket, the connector comprising a post having a mating edge, wherein at least a portion of the post resides within a connector body, a coupling member positioned axially with respect to the post, and means for conductively sealing and electrically coupling the post and the coupling member of the connector to help facilitate grounding of the connector, wherein the means for conductively sealing and electrically coupling physically and electrically contact the mating edge of the post.

A tenth general aspect relates to a method for grounding a coaxial cable through a connector, the coaxial cable having a center conductor surrounded by a dielectric, the dielectric being surrounded by a conductive grounding shield, the conductive grounding shield being surrounded by a protective outer jacket, the method comprising providing a connector, wherein the connector includes a connector body, a post having a mating edge, and a conductively coated member positioned to physically and electrically contact the mating edge of the post to facilitate grounding of the connector through the conductively coated member and the post to the cable, when the connector is attached to an interface port, fixedly attaching the coaxial cable to the connector, and advancing the connector onto an interface port until electrical grounding is extended through the conductively coated member.

An eleventh aspect relates generally to a method of facilitating electrical continuity through a coaxial cable connector, the coaxial cable having a center conductor surrounded by a dielectric, the dielectric being surrounded by a conductive grounding shield, the conductive grounding shield being surrounded by a protective outer jacket, the method comprising providing the connector, wherein the connector includes a connector body, a post having a mating edge, and a conductively coated member positioned to physically and electrically contact an inner surface of the coupling member to facilitate electrical continuity between the coupling member and the post to help shield against ingress of unwanted electromagnetic interference, fixedly attaching the coaxial cable to the connector, and advancing the connector onto an interface port.

The foregoing and other features of the invention will be apparent from the following more particular description of various embodiments of the invention.

BRIEF DESCRIPTION OF THE DRAWINGS

Some of the embodiments of this invention will be described in detail, with reference to the following figures, wherein like designations denote like members, wherein.

DETAILED DESCRIPTION OF EMBODIMENTS

Figure 1A:
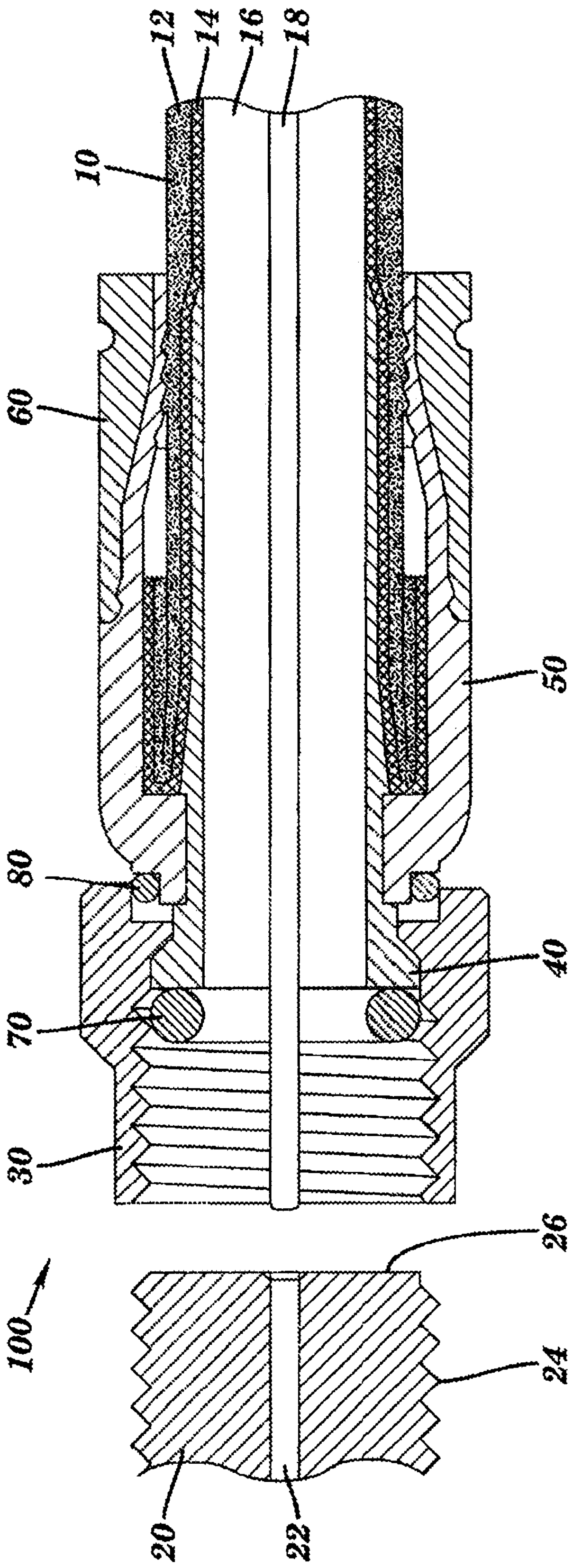
FIG. 1A depicts a sectional side view of a first embodiment of a connector.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms “a”, “an” and “the” include plural referents, unless the context clearly dictates otherwise.

Figure 1B:
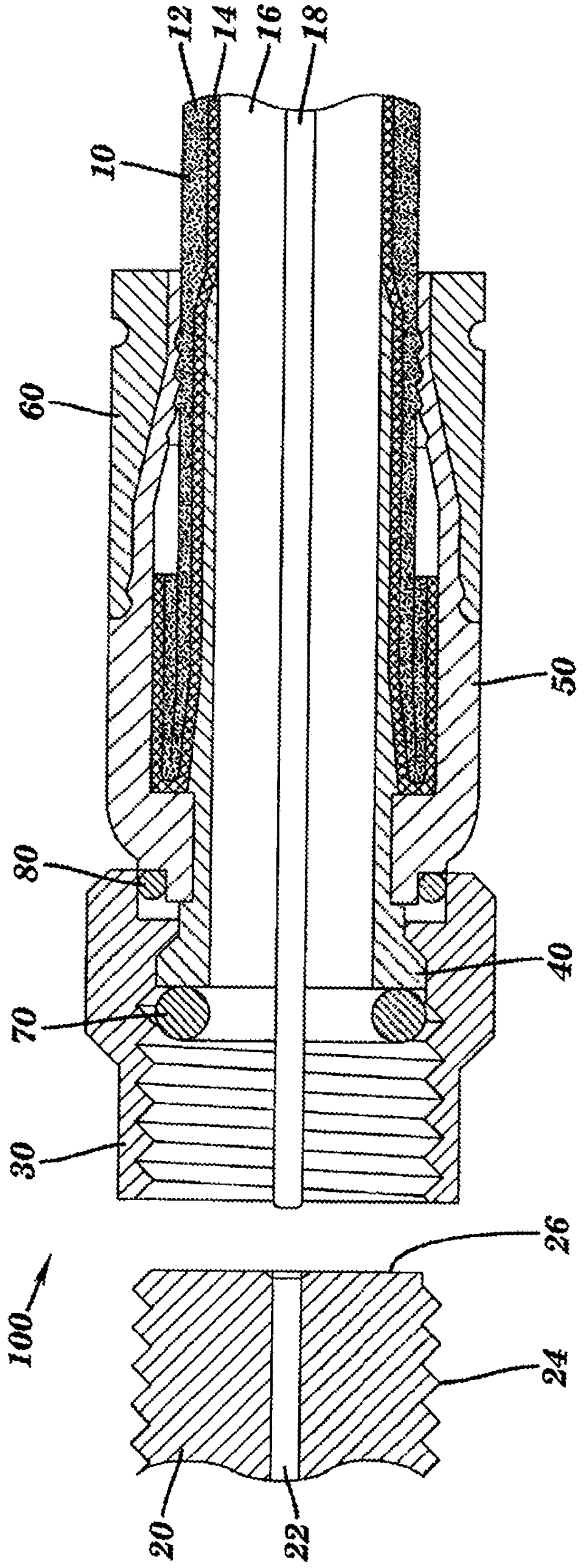
FIG. 1B depicts a sectional side view of a second embodiment of a connector

Referring to the drawings, FIGS. 1A and 1B depict a first and second embodiment of a connector 100. The connector 100 may include a coaxial cable 10 having a protective outer jacket 12, a conductive grounding shield 14, an interior dielectric 16 and a center conductor 18. The coaxial cable 10 may be prepared as embodied in FIGS. 1A and 1B by removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18. The protective outer jacket 12 is intended to protect the various components of the coaxial cable 10 from damage which may result from exposure to dirt or moisture and from corrosion. Moreover, the protective outer jacket 12 may serve in some measure to secure the various components of the coaxial cable 10 in a contained cable design that protects the cable 10 from damage related to movement during cable installation. The conductive grounding shield 14 may be comprised of conductive materials suitable for providing an electrical ground connection. Various embodiments of the shield 14 may be employed to screen unwanted noise. For instance, the shield 14 may comprise a metal foil wrapped around the dielectric 16, or several conductive strands formed in a continuous braid around the dielectric 16. Combinations of foil and/or braided strands may be utilized wherein the conductive shield 14 may comprise a foil layer, then a braided layer, and then a foil layer. Those in the art will appreciate that various layer combinations may be implemented in order for the conductive grounding shield 14 to effectuate an electromagnetic buffer helping to prevent ingress of environmental noise that may disrupt broadband communications. The dielectric 16 may be comprised of materials suitable for electrical insulation. It should be noted that the various materials of which all the various components of the coaxial cable 10 are comprised should have some degree of elasticity allowing the cable 10 to flex or bend in accordance with traditional broadband communications standards, installation methods and/or equipment. It should further be recognized that the radial thickness of the coaxial cable 10, protective outer jacket 12, conductive grounding shield 14, interior dielectric 16 and/or center conductor 18 may vary based upon generally recognized parameters corresponding to broadband communication standards and/or equipment.

Referring further to FIGS. 1A and 1B, the connector 100 may also include a coaxial cable interface port 20. The coaxial cable interface port 20 includes a conductive receptacle 22 for receiving a portion of a coaxial cable center conductor 18 sufficient to make adequate electrical contact. The coaxial cable interface port 20 may further comprise a threaded exterior surface 24. Although, various embodiments may employ a smooth as opposed to threaded exterior surface. In addition, the coaxial cable interface port 20 may comprise a mating edge 26. It should be recognized that the radial thickness and/or the length of the coaxial cable interface port 20 and/or the conductive receptacle 22 may vary based upon generally recognized parameters corresponding to broadband communication standards and/or equipment. Moreover, the pitch and height of threads which may be formed upon the threaded exterior surface 24 of the coaxial cable interface port 20 may also vary based upon generally recognized parameters corresponding to broadband communication standards and/or equipment. Furthermore, it should be noted that the interface port 20 may be formed of a single conductive material, multiple conductive materials, or may be configured with both conductive and non-conductive materials corresponding to the port’s 20 electrical interface with a connector 100. For example, the threaded exterior surface may be fabricated from a conductive material, while the material comprising the mating edge 26 may be non-conductive or vice-versa. However, the conductive receptacle 22 should be formed of a conductive material. Further still, it will be understood by those of ordinary skill that the interface port 20 may be embodied by a connective interface component of a communications modifying device such as a signal splitter, a cable line extender, a cable network module and/or the like.

Referring still further to FIGS. 1A and 1B, an embodiment of the connector 100 may further comprise a coupling member 30, a post 40, a connector body 50, a fastener member 60, a conductively coated mating edge member such as O-ring 70, and/or a connector body conductive member, such as O-ring 80, and means for conductively sealing and electrically coupling the connector body 50 and coupling member 30. The means for conductively sealing and electrically coupling the connector body 50 and coupling member 30 is the employment of the connector body conductive member 80 positioned in a location so as to make a physical seal and effectuate electrical contact between the connector body 50 and coupling member 30.

Figure 2:
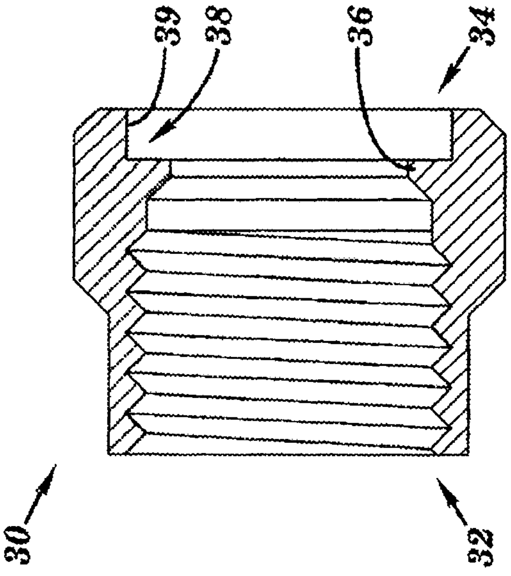
FIG. 2 depicts a sectional side view of an embodiment of a coupling member.

With additional reference to the drawings, FIG. 2 depicts a sectional side view of an embodiment of a coupling member 30 having a first end 32 and opposing second end 34. The coupling element 30 may be a nut, a threaded nut, port coupling element, rotatable port coupling element, and the like. The coupling element 30 may include an inner surface, and an outer surface; the inner surface of the coupling element 30 may be a threaded configuration, the threads having a pitch and depth corresponding to a threaded port, such as interface port 20. In other embodiments, the inner surface of the coupling element 30 may not include threads, and may be axially inserted over an interface port, such as port 20. The coupling element 30 may be rotatably secured to the post 40 to allow for rotational movement about the post 40. The coupling member 30 may comprise an internal lip 36 located proximate the second end 34 and configured to hinder axial movement of the post 40 (shown in FIGS. 1A and 1B). Furthermore, the coupling member 30 may comprise a cavity 38 extending axially from the edge of second end 34 and partial defined and bounded by the internal lip 36. The cavity 38 may also be partially defined and bounded by an outer internal wall 39. Embodiments of the coupling member 30 may touch or physically contact the connector body 50 while operably configured, such as when connector 100 is threaded and/or advanced onto port 20, as shown in FIG. 1B. Alternatively, embodiments of the coupling member 30 may not touch or physically contact the connector body 50 while operably configured, such as when connector 100 is threaded and/or advanced onto port 20, as shown in FIG. 1A. For instance, electrical continuity may be established and maintained through the connector 100 (e.g. between the coupling member 30 and the post 40) while the coupling member 30 does not touch the connector body 50. The coupling member 30 may be formed of conductive materials facilitating grounding through the connector. Accordingly the coupling member 30 may be configured to extend an electromagnetic buffer by electrically contacting conductive surfaces of an interface port 20 when a connector 100 (shown in FIGS. 1A and 1B) is advanced onto the port 20. The coupling member 30 may also be in physical and electrical contact with the conductively coated mating edge member 70. Embodiments of the conductively coated mating edge member 70 may be disposed within the generally axial opening of the coupling member 30, and may physically contact the inner surface of the coupling member 30 proximate the mating edge 46 of the post 40. Other embodiments of the conductively coated mating edge member 70 may not physically contact the inner surface of the coupling member 30 until deformation of the conductively coated mating edge member 70 occurs. Deformation may occur when the connector 100 is threaded onto the port 20 a sufficient distance such that the post 40 and the port 20 act to compress the conductively coated mating edge member 70. The physical and electrical contact between the conductively coated mating edge member 70 may establish and maintain electrical continuity between the coupler member 30 and the post 40 to extend a RF shield and grounding through the connector 100. In addition, the coupling member 30 may be formed of non-conductive material and function only to physically secure and advance a connector 100 onto an interface port 20. Moreover, the coupling member 30 may be formed of both conductive and non-conductive materials. For example the internal lip 36 may be formed of a polymer, while the remainder of the nut 30 may be comprised of a metal or other conductive material. In addition, the coupling member 30 may be formed of metals or polymers or other materials that would facilitate a rigidly formed body. Manufacture of the coupling member 30 may include casting, extruding, cutting, turning, tapping, drilling, injection molding, blow molding, or other fabrication methods that may provide efficient production of the component.

Figure 3:
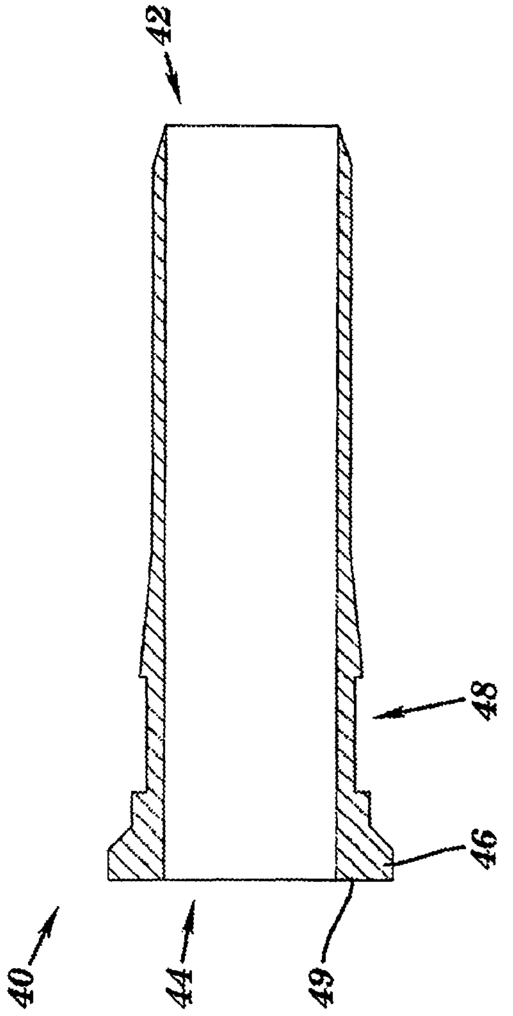
FIG. 3 depicts a sectional side view of an embodiment of a post.

With further reference to the drawings, FIG. 3 depicts a sectional side view of an embodiment of a post 40. The post 40 may comprise a first end 42 and opposing second end 44. Furthermore, the post 40 may comprise a flange 46 operatively configured to contact internal lip 36 of coupling member 30 (shown in FIG. 2) thereby facilitating the prevention of axial movement of the post beyond the contacted internal lip 36. Further still, an embodiment of the post 40 may include a surface feature 48 such as a shallow recess, detent, cut, slot, or trough. Additionally, the post 40 may include a mating edge 49. The mating edge 49 may be configured to make physical and/or electrical contact with an interface port 20 or conductively coated mating edge member or O-ring 70 (shown in FIGS. 1A and 1B). The post 40 should be formed such that portions of a prepared coaxial cable 10 including the dielectric 16 and center conductor 18 (shown in FIGS. 1A and 1B) may pass axially into the first end 42 and/or through the body of the post 40. Moreover, the post 40 should be dimensioned such that the post 40 may be inserted into an end of the prepared coaxial cable 10, around the dielectric 16 and under the protective outer jacket 12 and conductive grounding shield 14. Accordingly, where an embodiment of the post 40 may be inserted into an end of the prepared coaxial cable 10 under the drawn back conductive grounding shield 14 substantial physical and/or electrical contact with the shield 14 may be accomplished thereby facilitating grounding through the post 40. The post 40 may be formed of metals or other conductive materials that would facilitate a rigidly formed body. In addition, the post 40 may also be formed of non-conductive materials such as polymers or composites that facilitate a rigidly formed body. In further addition, the post may be formed of a combination of both conductive and non-conductive materials. For example, a metal coating or layer may be applied to a polymer of other non-conductive material. Manufacture of the post 40 may include casting, extruding, cutting, turning, drilling, injection molding, spraying, blow molding, or other fabrication methods that may provide efficient production of the component.

Figure 4:
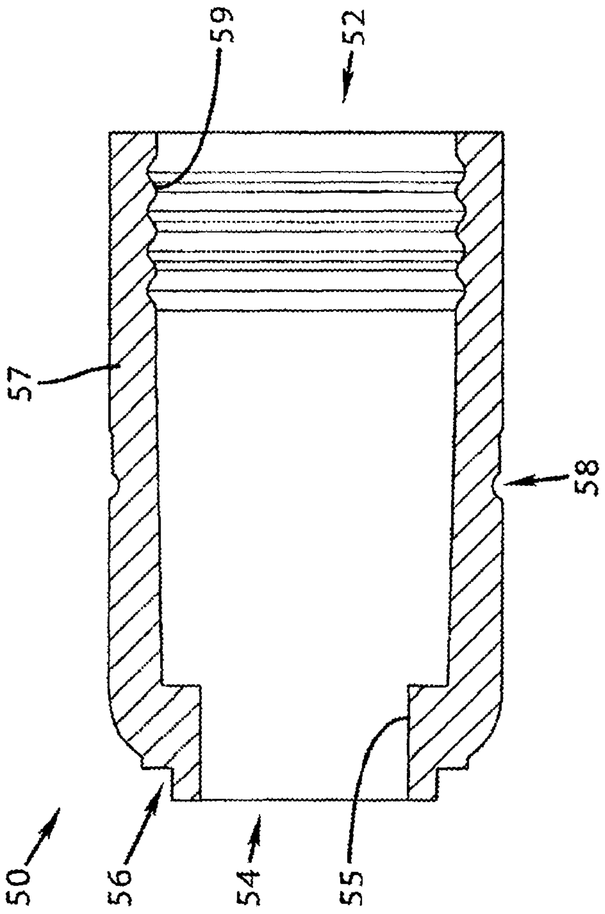
FIG. 4 depicts a sectional side view of an embodiment of a connector body.

With continued reference to the drawings, FIG. 4 depicts a sectional side view of a connector body 50. The connector body 50 may comprise a first end 52 and opposing second end 54. Moreover, the connector body may include an internal annular lip 55 configured to mate and achieve purchase with the surface feature 48 of post 40 (shown in FIG. 3). In addition, the connector body 50 may include an outer annular recess 56 located proximate the second end 54. Furthermore, the connector body may include a semi-rigid, yet compliant outer surface 57, wherein the outer surface 57 may include an annular detent 58. The outer surface 57 may be configured to form an annular seal when the first end 52 is deformably compressed against a received coaxial cable 10 by a fastener member 60 (shown in FIGS. 1A and 1B). Further still, the connector body 50 may include internal surface features 59, such as annular serrations formed proximate the first end 52 of the connector body 50 and configured to enhance frictional restraint and gripping of an inserted and received coaxial cable 10. The connector body 50 may be formed of materials such as, polymers, bendable metals or composite materials that facilitate a semi-rigid, yet compliant outer surface 57. Further, the connector body 50 may be formed of conductive or non-conductive materials or a combination thereof. Manufacture of the connector body 50 may include casting, extruding, cutting, turning, drilling, injection molding, spraying, blow molding, or other fabrication methods that may provide efficient production of the component.

Figure 5:
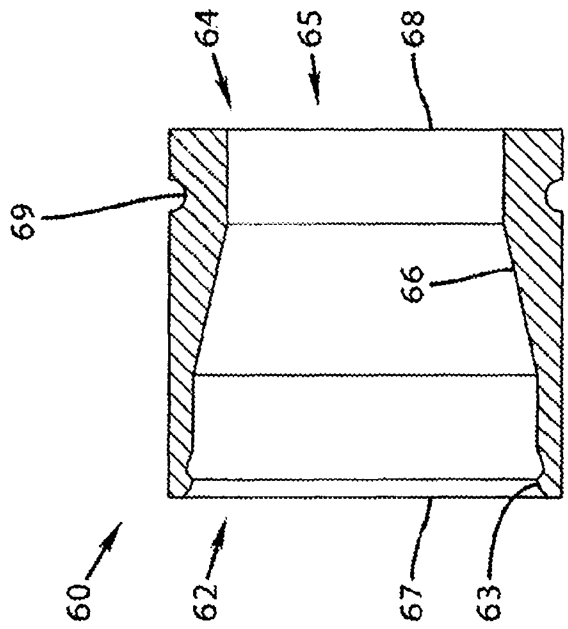
FIG. 5 depicts a sectional side view of an embodiment of a fastener member.

Referring further to the drawings, FIG. 5 depicts a sectional side view of an embodiment of a fastener member 60 in accordance with the present invention. The fastener member 60 may have a first end 62 and opposing second end 64. In addition, the fastener member 60 may include an internal annular protrusion 63 located proximate the first end 62 of the fastener member 60 and configured to mate and achieve purchase with the annular detent 58 on the outer surface 57 of connector body 50 (shown in FIG. 4). Moreover, the fastener member 60 may comprise a central passageway 65 defined between the first end 62 and second end 64 and extending axially through the fastener member 60. The central passageway 65 may comprise a ramped surface 66 which may be positioned between a first opening or inner bore 67 having a first diameter positioned proximate with the first end 62 of the fastener member 60 and a second opening or inner bore 68 having a second diameter positioned proximate with the second end 64 of the fastener member 60. The ramped surface 66 may act to deformably compress the outer surface 57 of a connector body 50 when the fastener member 60 is operated to secure a coaxial cable 10 (shown in FIGS. 1A and 1B). Additionally, the fastener member 60 may comprise an exterior surface feature 69 positioned proximate with the second end 64 of the fastener member 60. The surface feature 69 may facilitate gripping of the fastener member 60 during operation of the connector 100 (see FIGS. 1A and 1B). Although the surface feature is shown as an annular detent, it may have various shapes and sizes such as a ridge, notch, protrusion, knurling, or other friction or gripping type arrangements. It should be recognized, by those skilled in the requisite art, that the fastener member 60 may be formed of rigid materials such as metals, polymers, composites and the like. Furthermore, the fastener member 60 may be manufactured via casting, extruding, cutting, turning, drilling, injection molding, spraying, blow molding, or other fabrication methods that may provide efficient production of the component.

Figure 6:
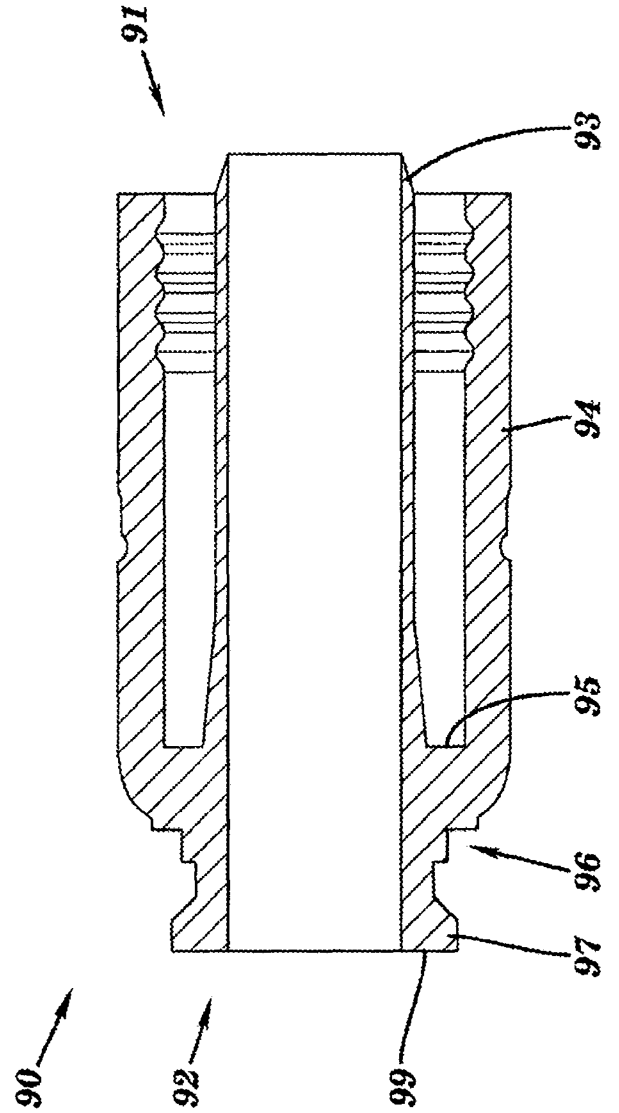
FIG. 6 depicts a sectional side view of an embodiment of a connector body having an integral post.

Referring still further to the drawings, FIG. 6 depicts a sectional side view of an embodiment of an integral post connector body 90 in accordance with the present invention. The integral post connector body 90 may have a first end 91 and opposing second end 92. The integral post connector body 90 physically and functionally integrates post and connector body components of an embodied connector 100 (shown in FIGS. 1A and 1B). Accordingly, the integral post connector body 90 includes a post member 93. The post member 93 may render connector operability similar to the functionality of post 40 (shown in FIG. 3). For example, the post member 93 of integral post connector body 90 may include a mating edge 99 configured to make physical and/or electrical contact with an interface port 20 or conductively coated mating edge member or O-ring 70 (shown in FIGS. 1A and 1B). The post member 93 of integral should be formed such that portions of a prepared coaxial cable 10 including the dielectric 16 and center conductor 18 (shown in FIGS. 1A and 1B) may pass axially into the first end 91 and/or through the post member 93. Moreover, the post member 93 should be dimensioned such that a portion of the post member 93 may be inserted into an end of the prepared coaxial cable 10, around the dielectric 16 and under the protective outer jacket 12 and conductive grounding shield 14. Further, the integral post connector body 90 includes an outer connector body surface 94. The outer connector body surface 94 may render connector 100 operability similar to the functionality of connector body 50 (shown in FIG. 4). Hence, outer connector body surface 94 should be semi-rigid, yet compliant. The outer connector body surface 94 may be configured to form an annular seal when compressed against a coaxial cable 10 by a fastener member 60 (shown in FIGS. 1A and 1B). In addition, the integral post connector body 90 may include an interior wall 95. The interior wall 95 may be configured as an unbroken surface between the post member 93 and outer connector body surface 94 of integral post connector body 90 and may provide additional contact points for a conductive grounding shield 14 of a coaxial cable 10. Furthermore, the integral post connector body 90 may include an outer recess formed proximate the second end 92. Further still, the integral post connector body 90 may comprise a flange 97 located proximate the second end 92 and operatively configured to contact internal lip 36 of coupling member 30 (shown in FIG. 2) thereby facilitating the prevention of axial movement of the integral post connector body 90 with respect to the coupling member 30. The integral post connector body 90 may be formed of materials such as, polymers, bendable metals or composite materials that facilitate a semi-rigid, yet compliant outer connector body surface 94. Additionally, the integral post connector body 90 may be formed of conductive or non-conductive materials or a combination thereof. Manufacture of the integral post connector body 90 may include casting, extruding, cutting, turning, drilling, injection molding, spraying, blow molding, or other fabrication methods that may provide efficient production of the component.

Figure 7A:
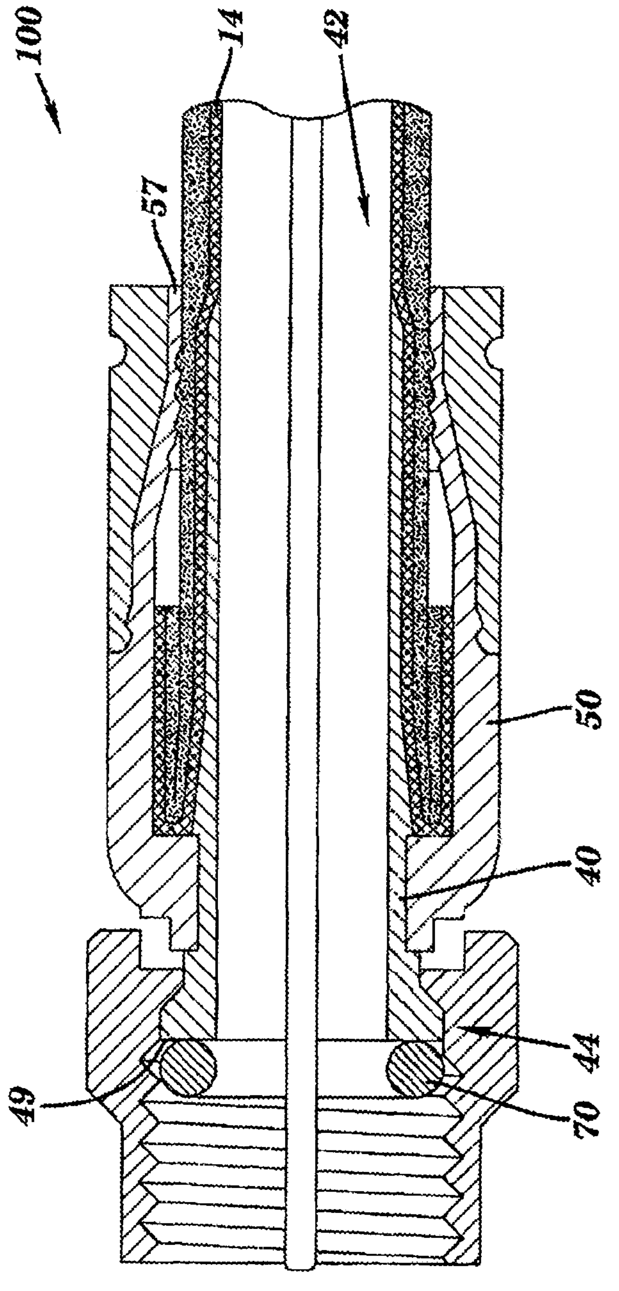
FIG. 7A depicts a sectional side view of the first embodiment of a connector configured with a conductive member proximate a second end of a post.
Figure 7B:
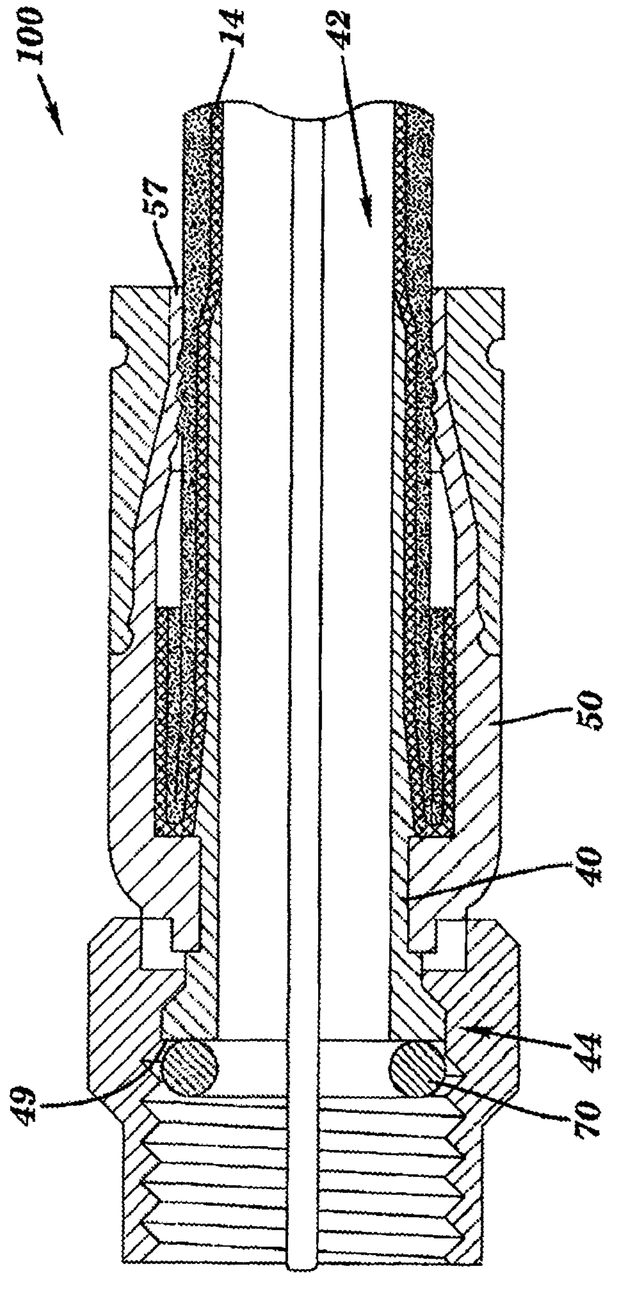
FIG. 7B depicts a sectional side view of the second embodiment of a connector configured with a conductive member proximate a second end of a post.

With continued reference to the drawings, FIGS. 7A and 7B depict a sectional side view of a first and second embodiment of a connector 100 configured with a conductively coated mating edge member 70 proximate a second end 44 of a post 40. The conductively coated mating edge member 70 may be configured to reside within a coupling member 30 of the connector 100, the conductively coated member 70 positioned to physically and electrically contact the mating edge of the post 40. The conductively coated mating edge member 70 should be conductive. For instance, the conductively coated elastomeric member 70 should exhibit levels of electrical and RF conductivity to facilitate grounding/shielding through the connector 100. Additionally, embodiments of the conductively coated mating edge member 70 may include a conductive coating or a partial conductive coating. For purposes of conductivity, the conductive coating may cover the entire outer surface of the coated mating edge member 70, or may partially cover the outer surface of the coated mating edge member 70. For example, embodiments of the coated mating edge member 70 may include one or more strips/portions of conductive coating spaced apart in a poloidal direction around the outer surface of the coated mating edge member 70. In another embodiment, the coated mating edge member 70 may include one or more strips/portions of conductive coating spaced apart in a toroidal direction around the outer surface of the mating edge member 70. Embodiments of the coated mating edge member 70 may include various configurations of conductive coating, including a weave-like pattern or a combination of rings and strips along both the poloidal and toroidal direction of the coated member 70. Coating the coated mating edge member 70 with a conductive coating can obtain high levels of electrical and RF conductivity from the conductively coated mating edge member 70 which can be used to extend a RF shield/grounding path through the connector 100.

Moreover, coating the coated mating edge member 70 may involve applying (e.g. spraying and/or spray coating with an airbrush) a thin layer of conductive coating on the outer surface of the coated mating edge member 70. Because only the outer surface of the coated mating edge member 70 is coated with a conductive coating, the entire cross-section of the coated mating edge member 70 need not be conductive (i.e. not a bulk conductive member). Thus, the coated mating edge member 70 may be formed form non-conductive elastomeric materials, such as silicone rubber having properties characteristic of elastomeric materials, yet may exhibit electrical and RF conductivity properties once the conductive coating is applied to at least a portion of the coated mating edge member 70. Embodiments of the conductive coating may be a conductive ink, a silver-based ink, and the like, which may be thinned out from a paste-like substance. Thinning out the conductive coating for application on the coated mating edge member 70 may involve using a reactive top coat as a thinning agent, such as a mixture of liquid silicone rubber topcoat, to reduce hydrocarbon off-gassing during the thinning process; the reactive topcoat as a thinning agent may also act as a bonding agent to the outer surface (e.g. silicone rubber) of the coated mating edge member 70. Alternatively, the conductive coating may be thinned with an organic solvent as a thinning agent. The application of a conductive coating onto the elastomeric outer surface or portions of the coated mating edge member 70 may result in a highly conductive and highly flexible skin or conductive layer on the outer surface of the coated mating edge member 70. Thus, a continuous electrical ground/shielding path may be established between the post 40, the coated mating edge member 70, and an interface port 20 due to the conductive properties shared by the post 40, coated mating edge member 70, and the port 20, while also forming a seal proximate the mating edge of the post 40.

The coated mating edge member 70 may comprise a substantially circinate torus or toroid structure adapted to fit within the internal threaded portion of coupling member 30 such that the coated mating edge member 70 may make contact with and/or reside continuous with a mating edge 49 of a post 40 when operatively attached to post 40 of connector 100. For example, one embodiment of the conductively coated mating edge member 70 may be an O-ring. The conductively coated mating edge member 70 may facilitate an annular seal between the coupling member 30 and post 40 thereby providing a physical barrier to unwanted ingress of moisture and/or other environmental contaminates. Moreover, the conductively coated mating edge member 70 may facilitate electrical coupling of the post 40 and coupling member 30 by extending therebetween an unbroken electrical circuit. In addition, the conductively coated mating edge member 70 may facilitate grounding of the connector 100, and attached coaxial cable (shown in FIG. 1), by extending the electrical connection between the post 40 and the coupling member 30. Furthermore, the conductively coated mating edge member 70 may effectuate a buffer preventing ingress of electromagnetic noise between the coupling member 30 and the post 40. The conductively coated mating edge member or O-ring 70 may be provided to users in an assembled position proximate the second end 44 of post 40, or users may themselves insert the conductively coated mating edge conductive O-ring 70 into position prior to installation on an interface port 20 (shown in FIGS. 1A and 1B). Additionally, the conductively coated mating edge member 70 may be formed of materials such including but not limited to conductive polymers, plastics, conductive elastomers, elastomeric mixtures, composite materials having conductive properties, soft metals, conductive rubber, and/or the like and/or any workable combination thereof, that may or may not need to be coated with a conductive coating as described supra. Those skilled in the art would appreciate that the conductively coated mating edge member 70 may be fabricated by extruding, coating, molding, injecting, cutting, turning, elastomeric batch processing, vulcanizing, mixing, stamping, casting, and/or the like and/or any combination thereof in order to provide efficient production of the component.

Figure 8A:
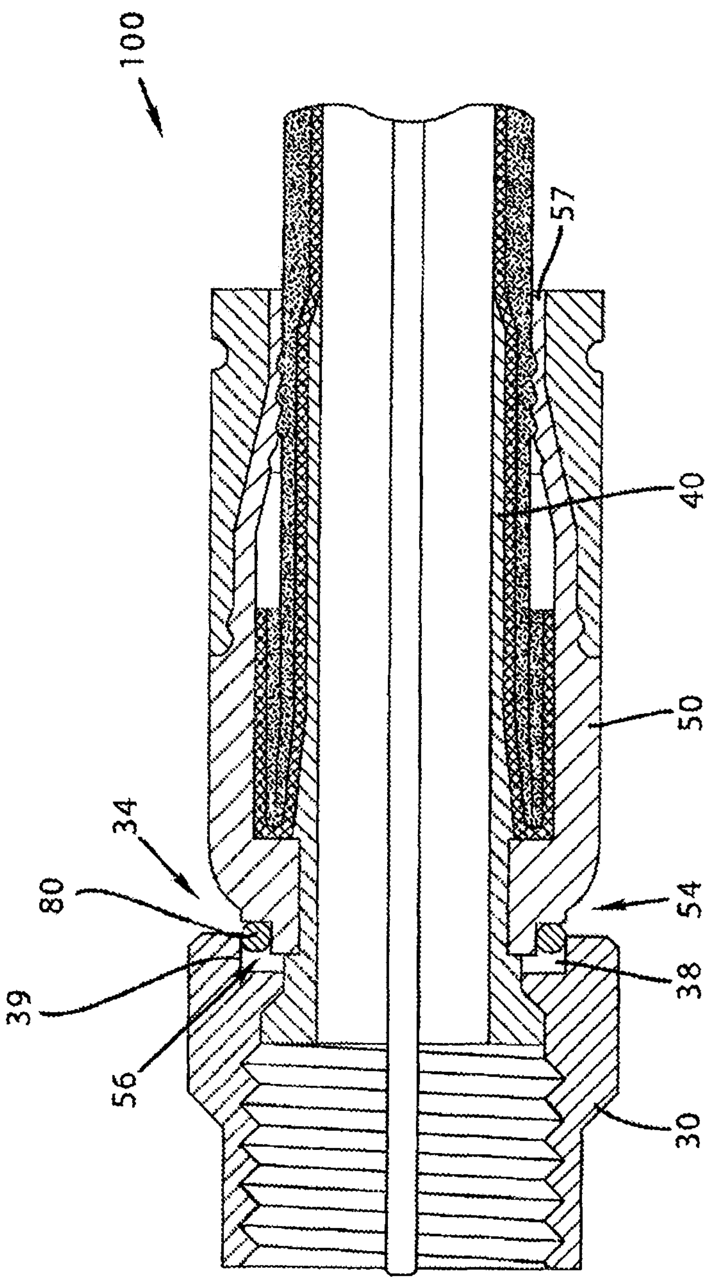
FIG. 8A depicts a sectional side view of the first embodiment of a connector configured with a conductive member proximate a second end of a connector body.
Figure 8B:
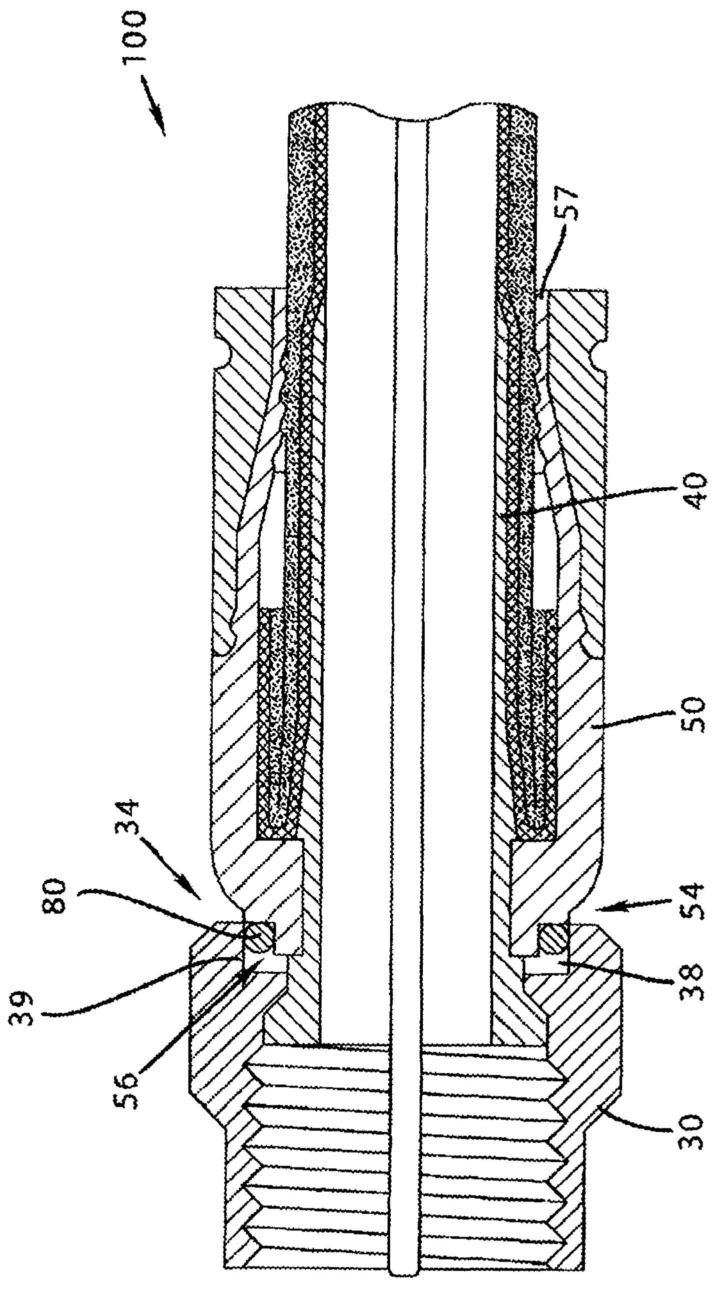
FIG. 8B depicts a sectional side view of the second embodiment of a connector configured with a conductive member proximate a second end of a connector body.

With still further continued reference to the drawings, FIGS. 8A and 8B depict a sectional side view of a first and a second embodiment of a connector 100 configured with a connector body conductive member 80 proximate a second end 54 of a connector body 50. The connector body conductive member 80 should be formed of a conductive material. Such materials may include, but are not limited to conductive polymers, plastics, elastomeric mixtures, composite materials having conductive properties, soft metals, conductive rubber, and/or the like and/or any workable combination thereof. The connector body conductive member 80 may comprise a substantially circinate torus or toroid structure, or other ring-like structure. For example, an embodiment of the connector body conductive member 80 may be an O-ring configured to cooperate with the annular recess 56 proximate the second end 54 of connector body 50 and the cavity 38 extending axially from the edge of second end 34 and partially defined and bounded by an outer internal wall 39 of coupling member 30 such that the connector body conductive O-ring 80 may make contact with and/or reside contiguous with the annular recess 56 of connector body 50 and outer internal wall 39 of coupling member 30 when operatively attached to post 40 of connector 100. The connector body conductive member 80 may facilitate an annular seal between the coupling member 30 and connector body 50 thereby providing a physical barrier to unwanted ingress of moisture and/or other environmental contaminates. Moreover, the connector body conductive member 80 may facilitate electrical coupling of the connector body 50 and coupling member 30 by extending therebetween an unbroken electrical circuit. In addition, the connector body conductive member 80 may facilitate grounding of the connector 100, and attached coaxial cable (shown in FIGS. 1A and 1B), by extending the electrical connection between the connector body 50 and the coupling member 30. Furthermore, the connector body conductive member 80 may effectuate a buffer preventing ingress of electromagnetic noise between the coupling member 30 and the connector body 50. It should be recognized by those skilled in the relevant art that the connector body conductive member 80, like the conductively coated mating edge member 70, may be manufactured by extruding, coating, molding, injecting, cutting, turning, elastomeric batch processing, vulcanizing, mixing, stamping, casting, and/or the like and/or any combination thereof in order to provide efficient production of the component. I should be further recognized that the connector body conductive member 80 may also be conductively coated like the conductively coated mating edge member 70. For example, the connector body conductive member 80 may include a conductive coating or a partial conductive coating around the outer surface of the connector body conductive member 80.

With reference to FIGS. 1A, 1B, and 6-8B, either or both of the conductively coated mating edge member or O-ring 70 and connector body conductive member or O-ring 80 may be utilized in conjunction with an integral post connector body 90. For example, the conductively coated mating edge member 70 may be inserted within a coupling member 30 such that it contacts the mating edge 99 of integral post connector body 90 as implemented in an embodiment of connector 100. By further example, the connector body conductive member 80 may be positioned to cooperate and make contact with the recess 96 of connector body 90 and the outer internal wall 39 of an operably attached coupling member 30 of an embodiment of a connector 100. Those in the art should recognize that embodiments of the connector 100 may employ both the conductively coated mating edge member 70 and the connector body conductive member 80 in a single connector 100. Accordingly the various advantages attributable to each of the conductively coated mating edge member 70 and the connector body conductive member 80 may be obtained.

A method for grounding a coaxial cable 10 through a connector 100 is now described with reference to FIGS. 1A and 1B which depict a sectional side view of a first and a second embodiment of a connector 100. A coaxial cable 10 may be prepared for connector 100 attachment. Preparation of the coaxial cable 10 may involve removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18. Various other preparatory configurations of coaxial cable 10 may be employed for use with connector 100 in accordance with standard broadband communications technology and equipment. For example, the coaxial cable may be prepared without drawing back the conductive grounding shield 14, but merely stripping a portion thereof to expose the interior dielectric 16.

With continued reference to FIGS. 1A and 1B and additional reference to FIGS. 7A and 7B, further depiction of a method for grounding a coaxial cable 10 through a connector 100 is described. A connector 100 including a post 40 having a first end 42 and second end 44 may be provided. Moreover, the provided connector may include a connector body 50 and a conductively coated mating edge member 70 located proximate the second end 44 of post 40. The proximate location of the conductively coated mating edge member 70 should be such that the conductively coated mating edge member 70 makes physical and electrical contact with post 40. In one embodiment, the conductively coated mating edge member or O-ring 70 may be inserted into a coupling member 30 until it abuts the mating edge 49 of post 40. However, other embodiments of connector 100 may locate the conductively coated mating edge member 70 at or very near the second end 44 of post 40 without insertion of the conductively coated mating edge member 70 into a coupling member 30.

Grounding may be further attained by fixedly attaching the coaxial cable 10 to the connector 100. Attachment may be accomplished by insetting the coaxial cable 10 into the connector 100 such that the first end 42 of post 40 is inserted under the conductive grounding sheath or shield 14 and around the dielectric 16. Where the post 40 is comprised of conductive material, a grounding connection may be achieved between the received conductive grounding shield 14 of coaxial cable 10 and the inserted post 40. The ground may extend through the post 40 from the first end 42 where initial physical and electrical contact is made with the conductive grounding sheath 14 to the mating edge 49 located at the second end 44 of the post 40. Once, received, the coaxial cable 10 may be securely fixed into position by radially compressing the outer surface 57 of connector body 50 against the coaxial cable 10 thereby affixing the cable into position and sealing the connection. The radial compression of the connector body 50 may be effectuated by physical deformation caused by a fastener member 60 that may compress and lock the connector body 50 into place. Moreover, where the connector body 50 is formed of materials having and elastic limit, compression may be accomplished by crimping tools, or other like means that may be implemented to permanently deform the connector body 50 into a securely affixed position around the coaxial cable 10.

As an additional step, grounding of the coaxial cable 10 through the connector 100 may be accomplished by advancing the connector 100 onto an interface port 20 until a surface of the interface port mates with the conductively coated mating edge member 70. Because the conductively coated mating edge member 70 is located such that it makes physical and electrical contact with post 40, grounding may be extended from the post 40 through the conductively coated mating edge member 70 and then through the mated interface port 20. Accordingly, the interface port 20 should make physical and electrical contact with the conductively coated mating edge member 70. The conductively coated mating edge member 70 may function as a conductive seal when physically pressed against the interface port 20. Advancement of the connector 100 onto the interface port 20 may involve the threading on of attached coupling member 30 of connector 100 until a surface of the interface port 20 abuts the conductively coated mating edge member 70 and axial progression of the advancing connector 100 is hindered by the abutment. However, it should be recognized that embodiments of the connector 100 may be advanced onto an interface port 20 without threading and involvement of a coupling member 30. Once advanced until progression is stopped by the conductive sealing contact of conductively coated mating edge member 70 with interface port 20, the connector 100 may be shielded from ingress of unwanted electromagnetic interference. Moreover, grounding may be accomplished by physical advancement of various embodiments of the connector 100 wherein a conductively coated mating edge member 70 facilitates electrical connection of the connector 100 and attached coaxial cable 10 to an interface port 20.

A method for electrically coupling a connector 100 and a coaxial cable 10 is now described with reference to FIGS. 1A and 1B. A coaxial cable 10 may be prepared for fastening to connector 100. Preparation of the coaxial cable 10 may involve removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18.

With continued reference to FIGS. 1A and 1B and additional reference to FIGS. 8A and 8B, further depiction of a method for electrically coupling a coaxial cable 10 and a connector 100 is described. A connector 100 including a connector body 50 and a coupling member 30 may be provided. Moreover, the provided connector may include a connector body conductive member or seal 80. The connector body conductive member or seal 80 should be configured and located such that the connector body conductive member 80 electrically couples and physically seals the connector body 50 and coupling member 30. In one embodiment, the connector body conductive member or seal 80 may be located proximate a second end 54 of a connector body 50. The connector body conductive member 80 may reside within a cavity 38 of coupling member 30 such that the connector body conductive member 80 lies between the connector body 50 and coupling member 30 when attached. Furthermore, the particularly embodied connector body conductive member 80 may physically contact and make a seal with outer internal wall 39 of coupling member 30. Moreover, the connector body conductive member 80 may physically contact and seal against the surface of connector body 50. Accordingly, where the connector body 50 is comprised of conductive material and the coupling member 30 is comprised of conductive material, the connector body conductive member 80 may electrically couple the connector body 50 and the coupling member 30. Various other embodiments of connector 100 may incorporate a connector body conductive member 80 for the purpose of electrically coupling a coaxial cable 10 and connector 100. For example, the connector body conductive member, such as O-ring 80, may be located in a recess on the outer surface of the coupling member 30 such that the connector body conductive O-ring 80 lies between the nut and an internal surface of connector body 50, thereby facilitating a physical seal and electrical couple.

Electrical coupling may be further accomplished by fixedly attaching the coaxial cable 10 to the connector 100. The coaxial cable 10 may be inserted into the connector body 50 such that the conductive grounding shield 14 makes physical and electrical contact with and is received by the connector body 50. In one embodiment of the connector 100, the drawn back conductive grounding shield 14 may be pushed against the inner surface of the connector body 50 when inserted. Once received, or operably inserted into the connector 100, the coaxial cable 10 may be securely set into position by compacting and deforming the outer surface 57 of connector body 50 against the coaxial cable 10 thereby affixing the cable into position and sealing the connection. Compaction and deformation of the connector body 50 may be effectuated by physical compression caused by a fastener member 60, wherein the fastener member 60 constricts and locks the connector body 50 into place. Moreover, where the connector body 50 is formed of materials having and elastic limit, compaction and deformation may be accomplished by crimping tools, or other like means that may be implemented to permanently contort the outer surface 57 of connector body 50 into a securely affixed position around the coaxial cable 10.

A further method step of electrically coupling the coaxial cable 10 and the connector 100 may be accomplished by completing an electromagnetic shield by threading the coupling member 30 onto a conductive interface port 20. Where the connector body 50 and coupling member 30 are formed of conductive materials, an electrical circuit may be formed when the conductive interface port 20 contacts the coupling member 30 because the connector body conductive member 80 extends the electrical circuit and facilitates electrical contact between the coupling member 30 and connector body 50. Moreover, the realized electrical circuit works in conjunction with physical screening performed by the connector body 50 and coupling member 30 as positioned in barrier-like fashion around a coaxial cable 10 when fixedly attached to a connector 100 to complete an electromagnetic shield where the connector body conductive member 80 also operates to physically screen electromagnetic noise. Thus, when threaded onto an interface port 20, the completed electrical couple renders electromagnetic protection, or EMI shielding, against unwanted ingress of environmental noise into the connector 100 and coaxial cable 10.

Additionally, a method of facilitating electrical continuity through a coaxial cable connector 100, the coaxial cable 10 having a center conductor 18 surrounded by a dielectric 16, the dielectric 16 being surrounded by a conductive grounding shield 14, the conductive grounding shield 14 being surrounded by a protective outer jacket 12, may include the steps of providing the connector 100, wherein the connector 100 includes a connector body 50, a post 40 having a mating edge 46, and a conductively coated member 70 positioned to physically and electrically contact an inner surface of the coupling member 30 to facilitate electrical continuity between the coupling member 30 and the post 40 to help shield against ingress of unwanted electromagnetic interference, fixedly attaching the coaxial cable 10 to the connector 100, and advancing the connector 100 onto an interface port 20.

While this invention has been described in conjunction with the specific embodiments outlined above, it is evident that many alternatives, modifications, and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A coaxial cable connector for coupling an end of a coaxial cable, the coaxial cable having a center conductor surrounded by a dielectric, the dielectric being surrounded by a conductive grounding shield, the conductive grounding shield being surrounded by a protective outer jacket, and for providing a coupler-body ground path when the coaxial cable connector is fully tightened on an interface port and when the connector is not fully tightened on the port comprising:

a conductive body member including a forward body end portion and an opposing rearward body end portion, the rearward body end portion configured to receive and be compressed against a prepared end of the coaxial cable, the forward body end portion having a forward facing body portion that comprises a forwardmost surface of the conductive body member and a conductive member outer body contact portion that extends at least partially in a radial direction when the connector is assembled;

a post member configured to engage the conductive body member, wherein the post member is not integral with the conductive body member such that the post member and the conductive body member are separate components from one another and such that at least a portion of the post member is located inside the conductive body member when the connector is assembled and when the rearward body end portion of the conductive body member receives and is compressed against the prepared end of the coaxial cable when the connector is assembled, the post member having a forward post end including a flange and a rearward post end, the rearward post end configured to be inserted into a portion of the coaxial cable around the dielectric and under at least a portion of the conductive grounding shield of the coaxial cable to make electrical contact with the conductive grounding shield of the coaxial cable, and the forward post end configured to rotatably engage the coupler;

a conductive coupler member configured to rotate relative to the post member and the conductive body member, the conductive coupler member including a forward coupler end portion configured to be coupled to an interface port, a rearward coupler end portion, and an internal lip, the internal lip having a forward lip surface facing the forward coupler end portion and a rearward lip surface facing the rearward coupler end portion;

a conductive metal ring grounding member including a coupler contact portion configured to be electrically coupled to the conductive coupler member and a body contact portion configured to at least partially encircle a portion of the conductive body member and be electrically and physically coupled to the conductive member outer body contact portion, which extends at least partially in the radial direction when the connector is assembled, of the conductive body member without contacting the forward facing body portion of the conductive body member so as to form a coupler-body electrical ground path between the conductive coupler member and the conductive member outer body contact portion of the conductive body member during operation of the connector when the connector is fully tightened on an interface port and even when the connector is not fully tightened on the interface port;

wherein the flange of the post member is configured to electrically contact the internal lip of the conductive coupler member so as to form a coupler-post electrical ground path between the conductive coupler member and the post member when the connector is fully tightened on an interface port; and wherein the conductive metal ring grounding member is configured to maintain the coupler-body electrical ground path in an unbroken state when the conductive metal ring grounding member is in electrical contact with the conductive body member and the conductive coupler member, even when the connector is not fully tightened on the interface port, where a gap exists between the conductive body member and the conductive coupler member such that the conductive body member is not in contact with the conductive coupler member and where the coupler-post electrical ground path is in a broken state, where the flange of the post member is not in contact with the internal lip of the conductive coupler member.

2. The connector of claim 1, wherein the conductive member outer body contact portion comprises an external body contact surface of the conductive body member.

3. The connector of claim 1, wherein the conductive member outer body contact portion comprises an external body contact surface of the conductive body member that at least partially faces a forward direction of the connector toward the interface port when the connector is assembled on the interface port.

4. The connector of claim 1, wherein the conductive member outer body contact portion comprises an external body contact surface of the conductive body member that faces toward the rearward coupler end portion of the conductive coupler member when the connector is assembled.

5. The connector of claim 1, wherein the body contact portion of the conductive metal ring grounding member contacts an external body contact surface of the conductive body member that at least partially faces a forward direction of the connector toward the interface port when the connector is assembled on the interface port.

6. The connector of claim 1, wherein the coupler contact portion of the conductive metal ring grounding member is at least partially located on an outward facing portion of the conductive metal ring grounding member.

7. The connector of claim 1, wherein the flange of the post member is configured to engage the internal lip of the conductive coupler member so as to prevent axial movement of the post member relative to the conductive coupler member while permitting rotational movement of the conductive coupler member relative to the post member when the connector is assembled.

8. The connector of claim 1, wherein the conductive metal ring grounding member is configured to fully encircle a portion of the conductive body member when the connector is assembled.

9. The connector of claim 1, wherein the conductive metal ring grounding member is not configured to electrically engage the post member or the interface port and is not configured to form a coupler-post-port ground path.

10. The connector of claim 1, wherein the conductive body member is configured to surround the post member and receive and be compressed against the coaxial cable when the connector is assembled.

11. A coaxial cable connector for providing a coupler-body ground path when the coaxial cable connector is fully tightened on an interface port and even when the connector is not fully tightened on the interface port comprising:

a metal body member that includes a rearward body end portion, which is configured to receive and be compressed against a prepared end of the coaxial cable, and a forward body end portion, which includes a forwardmost metal body member portion and an outwardly facing and at least partially radially extending body grounding portion when the connector is assembled, wherein the forwardmost metal body member portion is forwardly spaced from the outwardly facing and at least partially radially extending body grounding portion relative to a forward direction toward an interface port when the connector is assembled on the interface port, and wherein the rearward body end portion is rearwardly spaced from the forward body end portion relative to a rearward direction away from the interface port when the connector is assembled on the interface port;

a metal post member that includes a rearward post end portion, which is configured to be inserted in the metal body member and extend between a dielectric portion of the coaxial cable and a metal grounding shield portion of the coaxial cable when the connector is assembled so as to make electrical contact with the metal grounding shield portion of the coaxial cable and form a post-cable shield ground path during operation of connector, and a forward post end portion, which is forwardly spaced from the rearward post end portion relative to the forward direction, wherein the metal post member is a separate component from the metal body member;

a metal coupler member configured to rotate relative to the post member and the metal body member, the metal coupler member including a forward coupler end portion, which is configured to be coupled to an interface port, and a rearward coupler end portion, which is rearwardly spaced from the forward coupler end portion relative to a rearward direction away from the interface port when the connector is assembled on the interface port;

a metal ring coupler-body grounding member that includes a coupler contact portion, which is configured to be electrically coupled to the metal coupler member, and a body contact portion, which is configured to at least partially encircle and be electrically and physically coupled to the outwardly facing and at least partially radially extending body grounding portion of the metal body member without contacting the forwardmost metal body member portion of the metal body member so as to form a coupler-body ground path between the metal coupler member and the metal body member when the connector is fully tightened on the interface port and even when the connector is not fully tightened on the interface port;

wherein the post member is configured to electrically contact the metal coupler member so as to form a coupler-post ground path between the metal coupler member and the post member when the connector is fully tightened on the interface port; and wherein the metal ring coupler-body grounding member is configured to maintain the coupler-body ground path in an unbroken state when the metal ring coupler-body grounding member is in electrical contact with the metal body member and the metal coupler member, even when the connector is not fully tightened on the interface port, where a gap exists between the metal body member and the metal coupler member such that the metal body member is not in contact with the metal coupler member and where the coupler-post ground path is in a broken state, where the post member is not in contact with the metal coupler member.

12. The connector of claim 11, wherein the outwardly facing and at least partially radially extending body grounding portion of the metal body member comprises an external body contact surface of the metal body member.

13. The connector of claim 11, wherein the outwardly facing and at least partially radially extending body grounding portion of the metal body member is configured to at least partially face a forward direction of the connector toward the interface port when the connector is assembled on the interface port.

14. The connector of claim 11, wherein the outwardly facing and at least partially radially extending body grounding portion of the metal body member is configured to face toward the rearward coupler end portion of the metal coupler member when the connector is assembled.

15. The connector of claim 11, wherein the body contact portion of the metal ring coupler-body grounding member contacts an external body contact surface of the metal body member that at least partially faces a forward direction of the connector toward the interface port when the connector is assembled on the interface port.

16. The connector of claim 11, wherein the coupler contact portion of the metal ring coupler-body grounding member is at least partially located on an outward facing portion of the metal ring coupler-body grounding member.

17. The connector of claim 11, wherein the metal post member includes a flange portion that is configured to engage an internal lip of the metal coupler member so as to prevent axial movement of the metal post member relative to the metal coupler member while permitting rotational movement of the metal coupler member relative to the metal post member when the connector is assembled.

18. The connector of claim 11, wherein the metal ring coupler-body grounding member is configured to fully encircle a portion of the metal body member when the connector is assembled.

19. The connector of claim 11, wherein the metal ring coupler-body grounding member is not configured to electrically engage the interface port and is not configured to form a coupler-port ground path during operation of the connector.

20. The connector of claim 11, wherein the metal body member is configured to surround the metal post member and receive and be inwardly compressed against the prepared end of the coaxial cable when the connector is assembled.

21. A coaxial cable connector for providing a coupler-body ground path even when the connector is not fully tightened on the interface port comprising:

a body member that includes a rearward body end portion, which is configured to receive and be outwardly compressed against a prepared end of the coaxial cable, and a forward body end portion, which includes an outwardly facing and at least partially radially extending body grounding surface when the connector is assembled, wherein the rearward body end portion is rearwardly spaced from the forward body end portion relative to a rearward direction away from the interface port when the connector is assembled on the interface port;

a post member that includes a rearward post end portion, which is configured to be inserted in the body member and extend between a dielectric portion of the coaxial cable and a metal grounding shield portion of the coaxial cable when the connector is assembled so as to make electrical contact with the metal grounding shield portion of the coaxial cable and form a post-cable shield ground path during operation of connector, and a forward post end portion, which is forwardly spaced from the rearward post end portion relative to a forward direction toward the interface port when the connector is assembled on the interface port, wherein the post member is a separate component from the body member;

a coupler member configured to rotate relative to the post member and the body member, the coupler member including a forward coupler end portion, which is configured to be coupled to an interface port, and a rearward coupler end portion, which is rearwardly spaced from the forward coupler end portion relative to the rearward direction;

a metal ring coupler-body grounding member that includes a coupler contact portion, which is configured to be electrically coupled to the coupler member, and a body contact portion, which is configured to at least partially encircle and be electrically coupled to the outwardly facing and at least partially radially extending body grounding surface of the body member so as to form a coupler-body ground path between the coupler member and the body member when the connector is fully tightened on the interface port and even when the connector is not fully tightened on the interface port;

wherein the post member is configured to be electrically coupled to the coupler member so as to form a coupler-post ground path between the coupler member and the post member when the connector is fully tightened on the interface port; and wherein the metal ring coupler-body grounding member is configured to form the coupler-body ground path when the metal ring coupler-body grounding member is in electrical contact with the body member and the coupler member, even when the connector is not fully tightened on the interface port, where a gap exists between the body member and the coupler member such that the body member is not in contact with the coupler member and where a gap exists between the post member and the coupler member such that the post member is not in contact with the coupler and the coupler-post ground path is in a broken state.

22. The connector of claim 21, wherein the body contact portion of the metal ring coupler-body grounding member is configured to at least partially encircle and be electrically and physically coupled to the outwardly facing and at least partially radially extending body grounding surface of the body member without contacting the forwardmost body member portion of the body member so as to form the coupler-body ground path between the coupler member and the body member when the connector is fully tightened on the interface port and even when the connector is not fully tightened on the interface port.

23. The connector of claim 21, wherein the outwardly facing and at least partially radially extending body grounding surface of the body member comprises an external body contact surface of the body member.

24. The connector of claim 21, wherein the outwardly facing and at least partially radially extending body grounding surface of the body member is configured to at least partially face the forward direction.

25. The connector of claim 21, wherein the outwardly facing and at least partially radially extending body grounding surface of the body member is configured to face toward the rearward coupler end portion of the coupler member when the connector is assembled.

26. The connector of claim 21, wherein the body contact portion of the metal ring coupler-body grounding member contacts an external body contact surface of the body member that at least partially faces a forward direction of the connector toward the interface port when the connector is assembled on the interface port.

27. The connector of claim 21, wherein the coupler contact portion of the metal ring coupler-body grounding member is at least partially located on an outward facing portion of the metal ring coupler-body grounding member.

28. The connector of claim 21, wherein the metal ring coupler-body grounding member is configured to fully encircle a portion of the body member when the connector is assembled.

29. The connector of claim 21, wherein the metal ring coupler-body grounding member is not configured to electrically engage the post member or the interface port and is not configured to form a coupler-post-port ground path during operation of the connector.

30. The connector of claim 21, wherein the body member is configured to surround the post member and receive and be inwardly compressed against the prepared end of the coaxial cable when the connector is assembled.

* * * * *